United States Patent [19]
Ozawa et al.

[11] Patent Number: 5,805,312
[45] Date of Patent: Sep. 8, 1998

[54] THERMOGRAPHICAL IMAGE COPIER SYSTEM WITH REAL TIME COPYING AND VARIABLE READ AND RECORD SPEEDS

[75] Inventors: Naohiro Ozawa, Yokohama; Yasuo Otsuka; Akihiko Asada, both of Chigasaki; Toyota Honda; Mikio Shiraishi, both of Yokohama; Yasuyuki Kojima, Hitachi; Toshio Tanizoe, Naka-machi; Hiroshi Minoda; Akira Shimizu, both of Katsuta, all of Japan

[73] Assignee: Hitachi, Ltd., Tokyo, Japan

[21] Appl. No.: 280,391

[22] Filed: Jul. 26, 1994

[30] Foreign Application Priority Data

| Aug. 3, 1993 | [JP] | Japan | 5-192121 |
| Oct. 15, 1993 | [JP] | Japan | 5-257937 |
| Oct. 26, 1993 | [JP] | Japan | 5-267488 |

[51] Int. Cl.⁶ ............................................. H04N 1/047
[52] U.S. Cl. ...................... 358/503; 358/486; 347/189; 400/120.09
[58] Field of Search ................ 358/503, 296, 358/471, 474, 486, 494, 496, 497; 347/188, 189; 400/120.09

[56] References Cited

U.S. PATENT DOCUMENTS

| 4,823,195 | 4/1989 | Ito | 358/256 |
| 5,166,699 | 11/1992 | Yano et al. | 347/17 |
| 5,221,976 | 6/1993 | Dash et al. | 358/486 |
| 5,255,011 | 10/1993 | Minowa et al. | 346/76 |
| 5,373,372 | 12/1994 | Loewen | 358/486 |

FOREIGN PATENT DOCUMENTS

| 59-194874 | 11/1984 | Japan | 347/194 |
| 60-165270 | 8/1985 | Japan | 347/194 |

*Primary Examiner*—Peter S. Wong
*Assistant Examiner*—Derek J. Jardieu
*Attorney, Agent, or Firm*—Fay Shapre Beall Fagan Minnich & McKee

[57] ABSTRACT

An image copying system is disclosed which has a thermal head energized at a strobe current supply time rate corresponding to a current head temperature according to a preset strobe current supply time rate control characteristics. In copying operation at a standard speed, a read sensor 211 reads an image by performing N main scans in one sub scan. A signal processor 221 validates the image signal thus read once every N scans according to a selection signal from a mode control circuit 401. A record circuit 311 having a thermal head performs one main scan every sub scan. During a copying operation at a speed N times the standard speed, the sub scan speed is made N times and the read sensor 211 reads the image by performing one main scan every sub scan and the signal processor 221 makes the read image signal always valid by the selection signal. The record device 311 performs one main scan every sub scan. A single A/D converter is used for A/D converting head temperature as well as other output signal.

3 Claims, 30 Drawing Sheets

THERMOGRAPHICAL IMAGE COPIER SYSTEM WITH REAL TIME COPYING AND VARIABLE READ AND RECORD SPEEDS

BACKGROUND OF THE INVENTION

The present invention relates to an image copying device such as copier, printer or facsimile device, which has image read means for reading an image on a document and thermographical record means for copying the image read by the image read means on a recording sheet, and, particularly, to an image copying device in which read and record speed for a copying operation is variable and temperature control means for controlling temperature of a thermal record head is simple and inexpensive.

In a known thermographical recording, it is usual that thermal energy of a thermal head is recorded as an image on a recording medium such as thermographical recording sheet or a combination of thermographical transfer ink and a recording sheet. Density of the image printed on the recording sheet depends upon thermal energy of the thermal head, that is, a product of electric power supplied to the head and supply time, temperature of the thermal head and environmental temperature, and the thermal energy necessary for a specific recording is controlled by controlling the supply time of electric power. Therefore, in order to obtain a suitable supply time to achieve a recording energy necessary to obtain a required printing density, it is necessary to detect the head temperature and/or environmental temperature and control the recording energy so as to increase when the measured temperature is low or decrease when the measured temperature is high. Thus, if a recording period is equal to or longer than the supply time, it is possible to continuously record.

As a technique to minimize the thermographical recording time, Japanese Patent Publication No. S55-10383 and Japanese Patent Publication No. H4-1206 propose thermographical recording systems in which head temperature is detected and, when the detected head temperature is low, a recording period is made long, or vice versa.

On the other hand, in reading an image on a document, the image is converted into an electric signal by spatial sampling and time sampling of the image using a combination of an image sensor composed of photoelectric conversion elements such as CCD's and a light source (cf. Mitsuo OSHIMA, "Selection and Use of Image Sensor", Nikkan Kogyo Simbun, ISBN 4-526-01811-2, 1985).

An output of such image sensor is an analog voltage signal and has a value Vout equal to an integration of electric charge converted from light intensity H by the sensor over a constant time Tint as represented by the following equation:

$$Vout \propto H \times Tint$$

The output of the image sensor is saturable and sensitivity and saturation of the sensor have substantially no dependency on temperature.

That is, since intensity of light from the light source is constant so long as the light source is used under constant condition, a time period (storing time) necessary to correctly read an image by the image sensor becomes constant in a non-saturation range of the sensor, regardless of the environmental temperature.

As mentioned above, the read period for reading an image by the image sensor is constant while the recording period in thermographical recording is variable. Therefore, in a copying operation which is a combination of the reading and the recording, a copying speed must be selected such that it is acceptable for either one of a reading device and a recording device which has a lower capability by regulating light intensity of the light source when a longer recording period is necessary and/or regulating a recording voltage when a longer read period necessary, to obtain a required recording energy.

Generally, however, the copying speed, that is, the copying period, has been determined by not the read period but the record period. That is, although the record period depends largely on electric power supplied to the head, there is a limitation of capacity of the power source which is independent from the performance of the image copying device itself, when a total power consumption of the image copying device should be restricted.

As described, in the conventional technique, the copying speed, that is, the copying period, is determined by the record period. Further, the copying speed is constant in order to maintain a quality of image.

There are cases, however, in which the record period can be shortened without degrading image quality under the following conditions.

(1) The record period also has a dependency on sensitivity of the recording medium, the higher the sensitivity is the shorter the record period.

(2) The higher the temperature of the head the shorter the record period, as mentioned previously.

That is, when the sensitivity of the recording medium is high and/or the head temperature is increased, the image quality is not degraded even if the record period is shortened. Therefore, there is no trouble even if the copying period is shortened to conform it to the shortened record period to increase the copying speed. However, since there is only one copying speed in the conventional technique, the above mentioned performance of the device can not be used sufficiently.

According to experiments conducted by the inventors, it has been found that, when a recording is performed at a rate of 5 ms per scan line, recording energy supplied for every scan line is 70 to 80% of energy required when a recording is performed at a rate of 10 ms per scan line, with good colors.

Further, a user who is copying an image may want to obtain a copy of high image quality within short copying time, that is, at high speed. In order to realize both of the two contradictory requirements, the copying device becomes expensive. Therefore, another demand of inexpensive copying device occurs. With such inexpensive copying device, either of these two requirements may be somewhat sacrificed. Even so, such copying device is not available heretofore.

In a image copying device, two A/D converters are required, one for converting an analog output of an image sensor into a digital data and the other for converting an analog output of a thermistor for detecting temperature of a substrate of the recording head into a digital data. In order to reduce a cost of the device, it is desired to reduce the number of the A/D converters. Such a reduction in the number of A/D converters may be obtained in a copying operation by having the read operation and record operation be simultaneously performed by performing the A/D conversions of the sensor output and the thermistor output in time series. However, such an operation to obtain a reduction in the number of A/D converters will result in undesirable high speed copying operations.

As mentioned previously, the facsimile device operating with line scan time of 10 ms usually use the thermographical paper as the recording sheet. When the operating speed is increased by simply making the line scan time to 5 ms, the recording energy is reduced correspondingly, resulting in reduced record density. Therefore, in order to maintain the record density at the increased operating speed, it is necessary to make the record energy twice.

In order to realize this, the following measures are required.

(1) Increase the efficiency of the thermal head.

(2) Use the historical effect by shortening the line scan time.

(3) Change the control characteristics of relationship between the head temperature and the strobe current supply time rate in order to control the thermal head.

As to the above measure (1), the inventors have found that the energy efficiency of thermal head can be increased about 40% by using a thick thermal head including heat generating resistors each having relatively small resistance and an improved protective film therefor. As to the measure (2) above, it has been found that the energy efficiency can be increased about 10% by the historical effect due to the change of one line scan time from 10 ms to 5 ms, that is, thermal accumulation effect due to shortened head cooling time. Therefore, due to the effects related to the measures (1) and (2) above, the energy efficiency can be increased by 140×110=154%.

However, this improvement of energy efficiency is not enough to increase the recording energy for the one line scan time of 5 ms twice that for the one line scan time of 10 ms and it is necessary to further increase the energy efficiency by about 30% by the effect to be obtained by improving the measure (3) above. However, since the upper limit value of the control characteristics curve for controlling the thermal head, which is represented by the relation between the the head temperature and the strobe current supply time rate, is usually set to the limit characteristics (limit value) corresponding to the capacity of power source, it is impossible to increase the recording energy to a required value in a lower temperature range, in which a large recording energy is required, within 5 ms, even if the maximum value of the strobe current supply time rate is used. Of course, it is possible to solve this problem by using a power source having large capacity. However, the use of large power source leads to an increase of cost and size of the facsimile device.

Japanese Patent Application Laid-open No. H2-121467 discloses a thermographical recording method for a facsimile device in which, in a start time period of recording during which the head temperature is low, the same line is recorded several times to obtain a required record concentration. However, this method is not suitable for such high speed recording or printing as in the present invention.

SUMMARY OF THE INVENTION

A first object of the present invention is to provide a high speed, high image quality copying device.

A second object of the present invention is to provide a high speed, high image quality and inexpensive copying device.

A third object of the present invention is to provide a method of controlling a thermographical recording device such that a required record concentration can be obtained without increasing the capacity of power source even if the record time for one scan line is shortened.

In order to achieve the first object, a copying device according to the present invention comprises thermographical recording means, recording control means for controlling an operation of the thermographical recording means, read means, read control means for controlling an operation of the read means, mode control means for controlling operation timing of the reading and recording operations to control a copying operation and speed switching means for changing the operation timing of the mode control means according to a copying speed, wherein strobe data for current supply to a recording head is stored in the record control means correspondingly to a copying speed to control heat generation correspondingly to the speed, wherein, during a copying operation at a standard speed, a sensor scans 1 line N times (N is an integer larger than 1) and data obtained by first time scan is discarded and data obtained by second time scan is sent to the recording head as an effective data and wherein, during a high speed copying operation, that of the standard speed copying operation and the sensor scans 1 line once and the sensor output is sent to the recording head as effective data to perform a copying operation.

According to the present invention, the second object is achieved by using a single A/D converter instead of two A/D converters, one for the sensor output and the other for the thermistor output of the recording head and a switch provided on an input side of the single A/D converter for switching an input of the single A/D converter between the sensor output and the thermistor output under control of the mode control means. Strobe data for supplying current to the record head is stored in the record control means correspondingly to the head temperature to control heating of the head and, during a record operation, the head temperature is read at a time immediately before the start of record operation and once every scan of N lines by operating the switch so that strobe data corresponding to the head temperature thus read is sent to the record head, and the record is performed with the image signal and timing selected by the data transfer control means. During a copying operation at a standard speed, the sensor scans once every sub scan and data obtained by this scan is sent to the record head as valid data. The switch is switched once every N lines (N is an integer larger than 1 and corresponds to 1 cm to 10 cm of recording length) to read temperature data in the record control means in which data of a line for which the head temperature is read is interpolated with data read in a preceding line.

According to the present invention, the third object is achieved, in a facsimile device operable in a low speed record mode and a high speed record mode, by a method comprising the steps of measuring a head temperature of a thermal head in the high speed record mode immediately before a start of recording of each page, determining the measured head temperature as a high temperature range or a low temperature range with reference to a predetermined temperature value, setting the one line record time to a first time value t1 when the measured temperature is determined as the high temperature and setting the one line scan time to a second time value t2 larger than t1 when the measured temperature is determined as the low temperature range.

When the high speed record mode is selected, a system controller compares the measured temperature T of the head (practically, a head substrate temperature or a head casing temperature) with a predetermined temperature Ts (for example, 15° C.) and, when T>Ts, determines it as high temperature range and, when T<Ts, determines it as low temperature range. That is, when the environmental temperature is lower than Ts and a page recording is started, it is determined as low temperature range since the head temperature is low. On the contrary, when the environmental temperature is higher than Ts or the head temperature is kept at a value not lower than Ts due to thermal accumulation effect of a continuous recording operation, it is determined as high temperature range.

When it is determined as high temperature range, the system controller sets the one line scan time for the page to the first time value t1 (for example, 5 ms) and controls heating of the thermal head at a strobe current supply time rate corresponding to a current head temperature according to the preliminarily given control characteristics curve representing the relation between the head temperature and the strobe current supply time rate. That is, in order to maintain an optimal concentration of a thermographical record of the respective scan lines (respective record lines), the one line scan time is set to the first time value t1=5 ms to perform the recording as high speed as possible in the high temperature range in which the strobe current supply time rate can be controlled correspondingly to the head temperature according to the slope of the control characteristics curve.

When it is determined as the low temperature range, the system controller sets the one line scan time of the page to the second time value t2 (for example, 6 ms) which is longer than the first time value t1 by a predetermined time to expand the one line scan time by 20%. That is, in the low head temperature range in which a required record concentration can not be maintained with the one line scan time of 5 ms, that is, it is impossible to increase the strobe current supply time rate due to limitation of power source capacity, the required record energy is obtained by increasing the one line scan time from 5 ms to 6 ms which is considerably shorter than the conventional one line scan time of 10 ms.

DETAILED DESCRIPTION OF THE PREFERRED EMBODIMENTS

Figure 1:
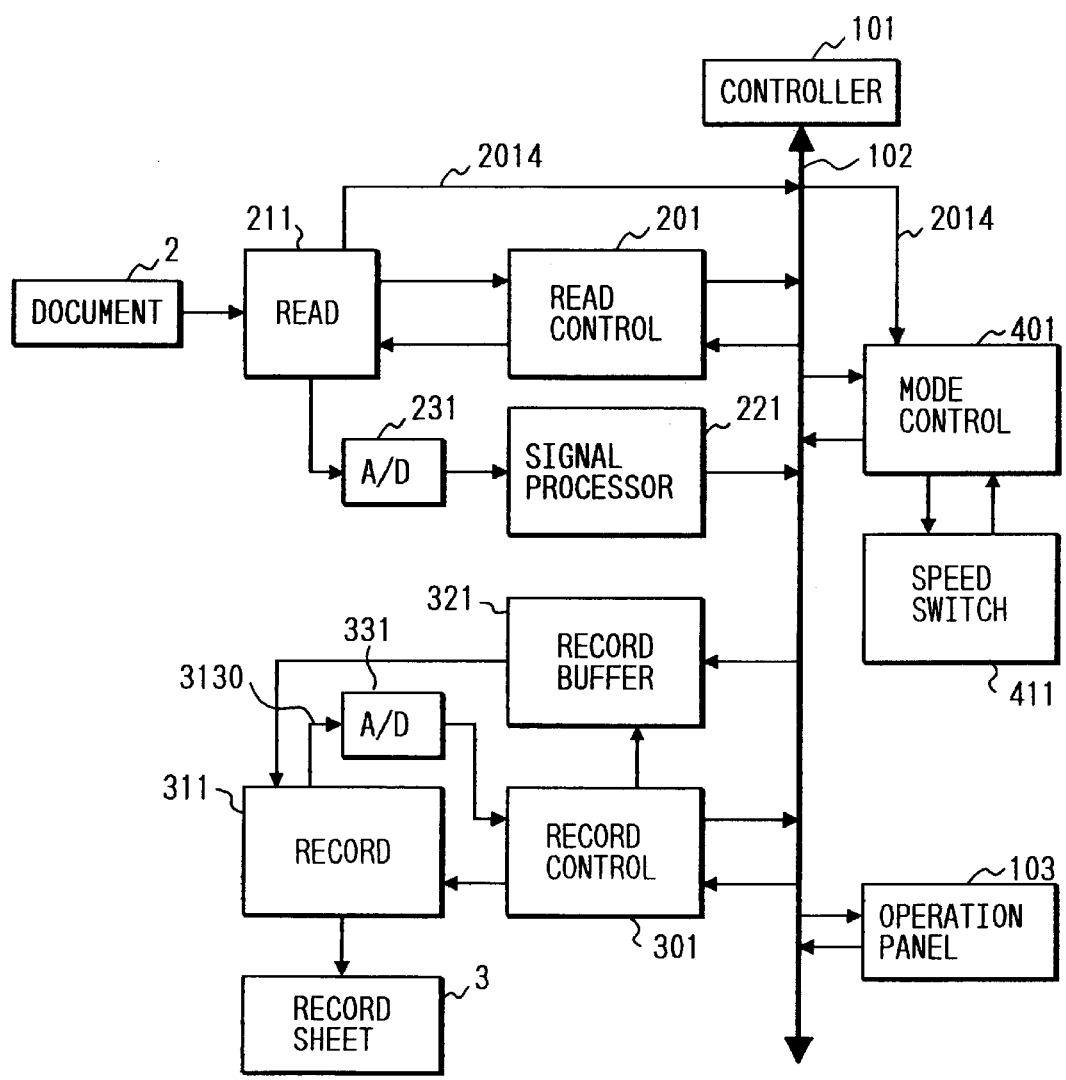
FIG. 1 is a block diagram showing a construction of an image copying device according to a first embodiment of the present invention.

FIG. 1 is a block diagram showing a construction of an image copying device according to a first embodiment of the present invention. In this embodiment, a high speed copying operation is performed at a speed twice a standard speed.

As shown in FIG. 1, the copying device according to the first embodiment of the present invention comprises a controller 101 for controlling an operation of a whole device, a bus 102 including a system bus and data bus, etc., an operation panel 103 for operating the image copying device, a read portion 211 for reading an information on a document 2, a read control portion 201 for controlling a read operation of the read portion 211, an A/D converter 231 for converting an image output from the read portion 211 into a digital data, a signal processor 221 for binarizing the digital data by means of a certain slice level or providing a half tone representation by binarized image using Dither system or Error diffusion system, a record portion 311 for recording an image on a recording sheet 3 such as thermographical paper or a thermographical recording medium using thermal transfer ink, an A/D converter 331 for converting a head temperature signal 3130 from a thermistor (not shown) provided on a recording head (not shown) of the recording portion 311 for detecting head temperature, practically, temperature of a substrate of the recording head, into a digital data, a record control portion 301 for controlling the record portion 311 in response to the head temperature to thereby perform a record operation, a record buffer 321 for storing an image data to be recorded, a mode control portion 401 for controlling the read control portion 201 and the record control portion 301 according to an operation mode instructed through the operation panel 103 and a speed switching portion 411 for determining a control timing of the mode control portion 401 according to a copying speed instructed through the operation panel 103.

As mentioned above, the image copying device according to the first embodiment can be roughly divided to a portion including the read portion, a second portion including the record portion and a third portion including the mode control portion.

First, the first portion including the read portion will be described with reference to FIG. 2 which shows the construction of the read portion 211 in detail.

The read portion 211 includes a roller drive portion 212 composed of a stepping motor (not shown) as a driving source and a gear train (not shown) as a driving force transmission, a read sensor 215 composed of a sensor portion 217 including a photoelectric element and a light source 216 for reading an image of the document 2 in a main scan direction, a roller 213 in pressure contact with the read sensor 215 for transporting the document 2 in a sub scan direction and a document position detector 214 provided in an upstream side of the read portion 215 for detecting a pass of the document 2.

The read control portion 201 supplies a motor drive pulse 20131 to the roller drive portion 212 and a sensor drive pulse 2151 to the read sensor 215. The read sensor 215 reads the document 2 and supplies an image signal 2170 to the A/D converter 231 a digitized image signal 2171 from which is supplied to the signal processor 221. An output 2140 of the document position detector 214 is supplied to the controller 101 through the bus 102.

Figure 3:
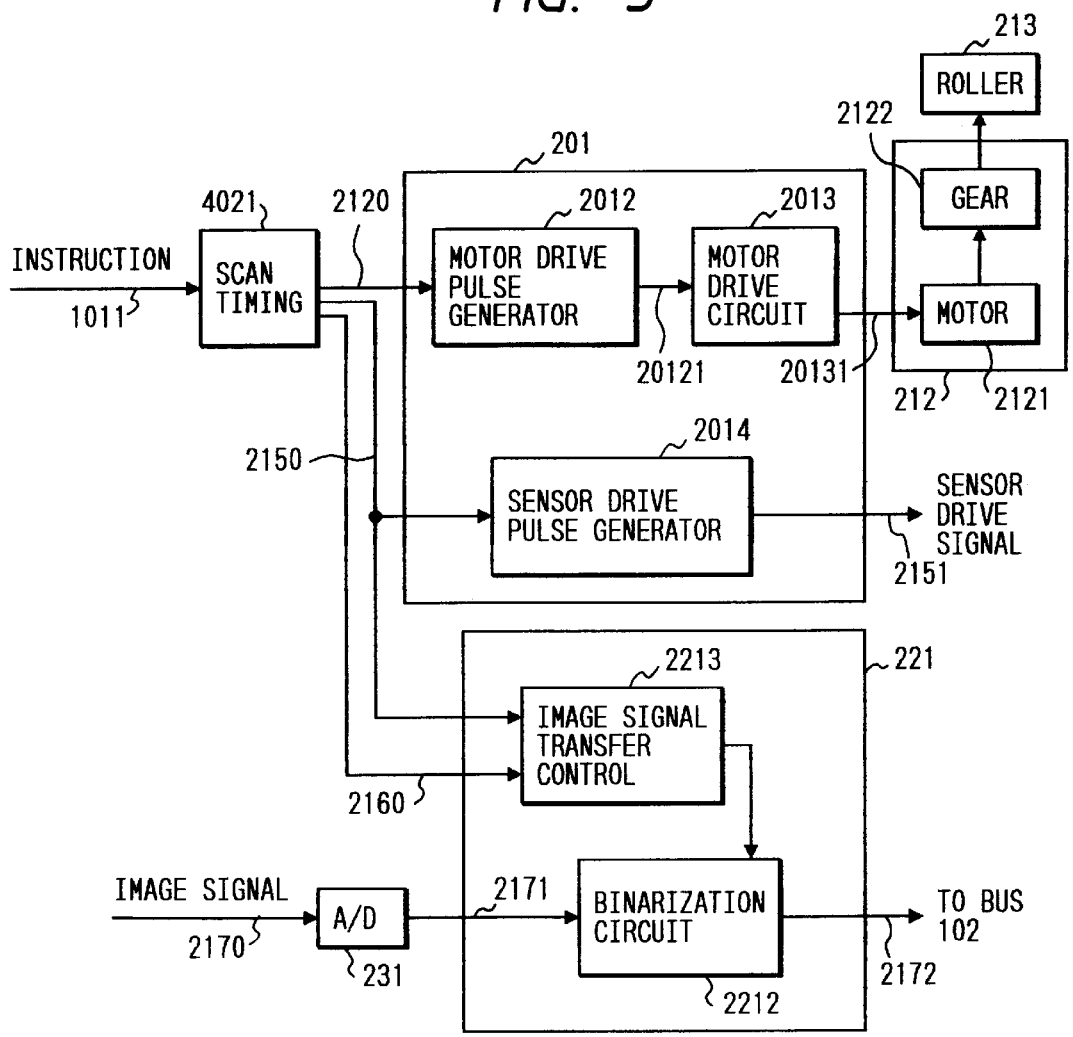
FIG. 3 is a block diagram showing constructions of a read control portion 201 and a signal processor 221 of the first embodiment shown in FIG. 1.

FIG. 3 shows details of the read control portion 201 and the signal processor 221 of the device shown in FIG. 1.

The read portion 201 comprises a motor drive pulse generator 2012, a motor drive circuit 2013 and a sensor drive pulse generator 2014. The signal processor 221 comprises an image signal transfer controller 2213 and a binarization circuit 2212. In the read control portion 201, a line start pulse 2120 from a read scan timing generator 4021 is input to the motor drive pulse generator 2012 a motor drive pulse 20121 from which is stepped up by the motor drive circuit 2013 and supplied to a stepping motor 2121 of the roller drive portion 212 as a motor drive pulse 20131 to rotate the roller 213 through the gear train 2122 to thereby transport the document 2 in the sub scan direction. A main scan pulse 2150 output from the read scan timing generator 4021 is supplied to the sensor drive pulse generator 2014 to generate a sensor drive signal 2151 to thereby drive the read sensor 215. Thus, the read sensor 215 reads the image on the document 2 in the main scan direction for every input of the sensor drive signal 2151. In the signal processor 221, the image signal transfer controller 2213 receives the main scan pulse 2150 and a selection signal 2160 both from the read scan timing generator 4021 of the mode control portion 401, controls the binarization circuit 2212 to select the A/D converted image signal 2171 with a predetermined timing and to convert it into a binary data by means of the Dither or error diffusion process and outputs the binary data as an image data 2172 to the bus 102, which is stored sequentially in the record buffer 321.

Figure 2:
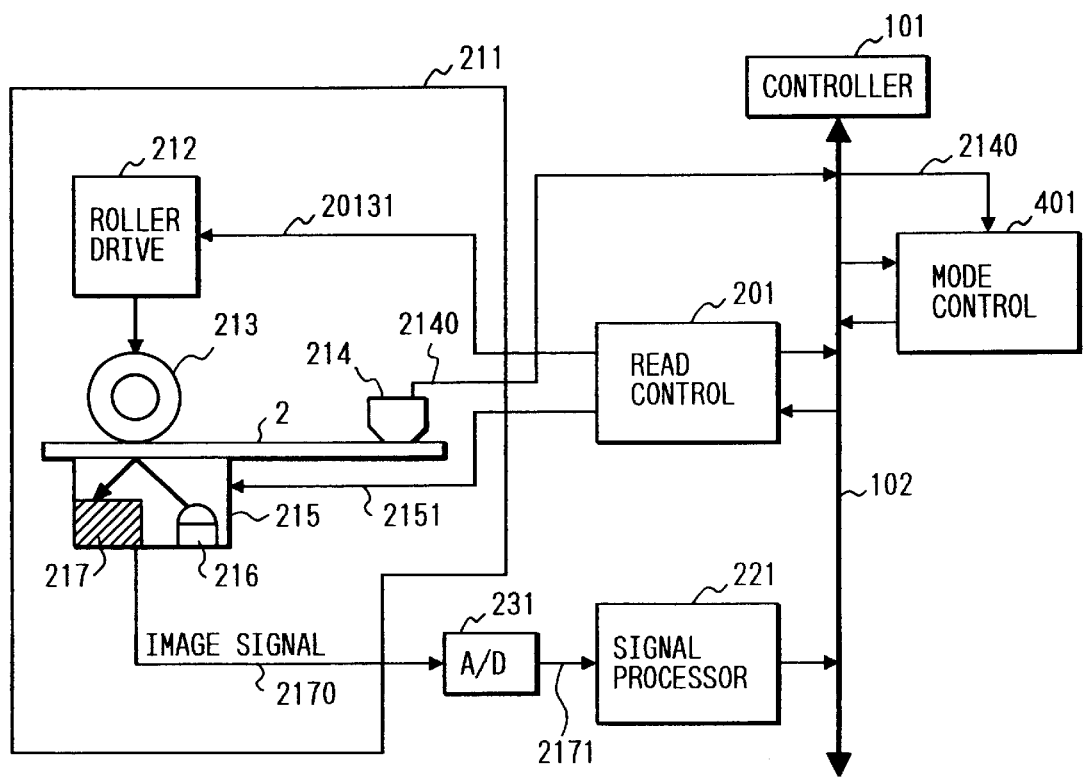
FIG. 2 is a block diagram showing a construction of a read portion 211 of the first embodiment in FIG. 1.
Figure 4:
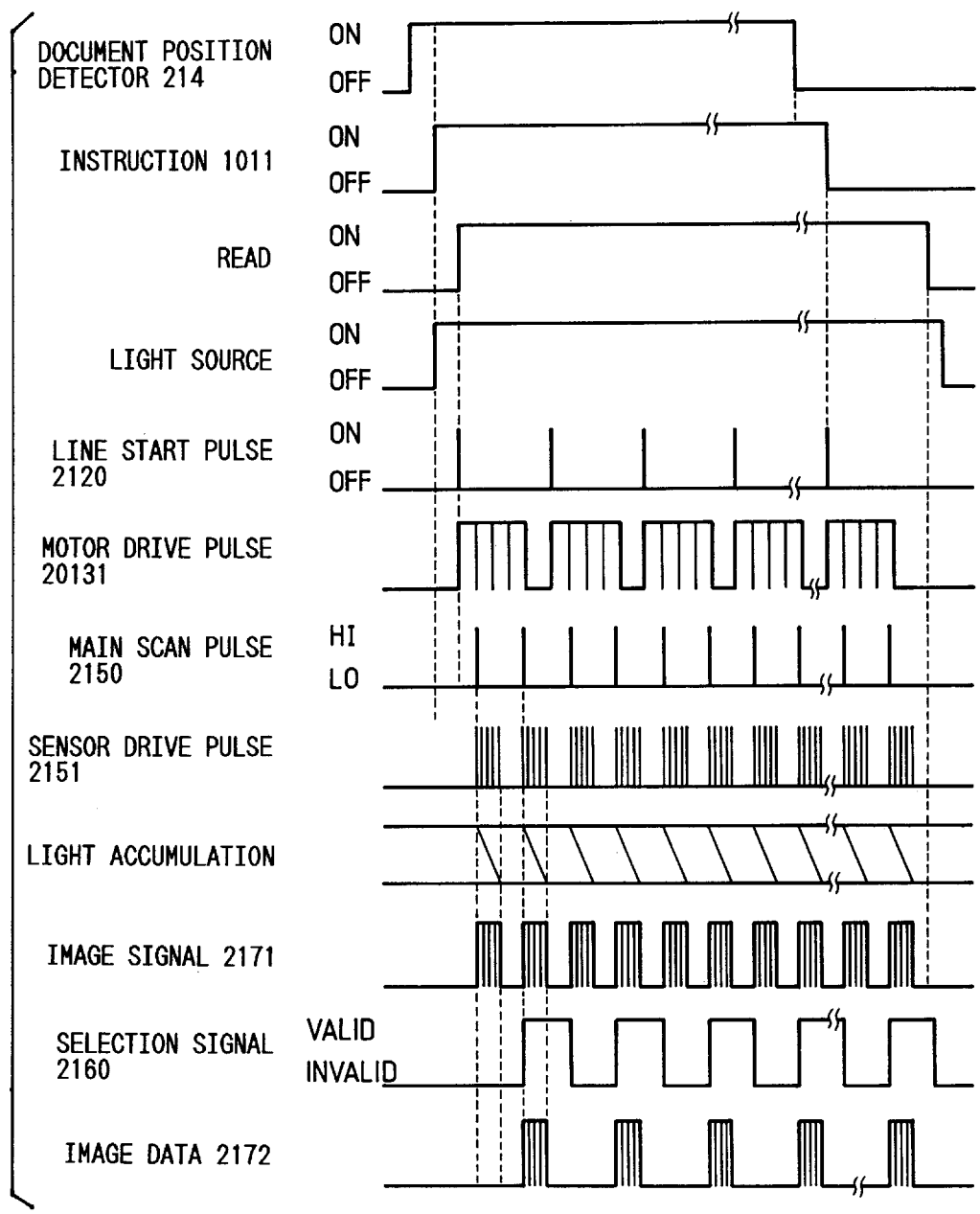
FIG. 4 is a timing chart showing a read operation of the first embodiment.

FIG. 4 shows a timing of the read operation of the first embodiment shown in FIGS. 1 to 3.

In FIG. 4, after the output of the document position detector 214 is turned ON indicating that the document 2 is set in the read portion 211, the controller 101 outputs a start instruction to an operation mode setting portion (not shown) of the mode control portion 401, upon which the operation mode setting portion accepts a copying operation according to an operation content of the operation panel 103 and outputs a copy instruction 1011 to the read scan timing generator 4021 of the mode control portion 401.

In the read portion 211, the light source 216 of the read sensor 215 is lit and the sensor portion 217 accumulates light. When the document 2 passes through the read sensor 215 and the read operation is started, the read scan timing generator 4021 outputs a line start pulse 2120 every sub scan of 1 line, upon which the motor drive circuit 2013 generates motor drive pulse 20131 to rotate the roller 213. Since there is a time lag between the start of the motor 2121 and an actual start of the document 2 due to backlash and/or distortion of gear shafts of the gear train, the read scan timing generator 4021 generates the main scan pulse 2150 during a period of a half line after the line start pulse 2120 and generates a sensor drive signal 2151 in synchronism with the main scan pulse 2150, so that the read sensor 215 scans 1 line twice, resulting in two image signals 2171. In this case, it is possible to select one of two image signals 2171 as a valid signal by the selection signal 2160 and to output it as the image data 2172 from the binarizing circuit 2212 once for 1 line and thus to read the image on the document 2.

Next, the construction of the record portion 311 of the first embodiment shown in FIG. 1 will be described with reference to FIG. 5.

Figure 5:
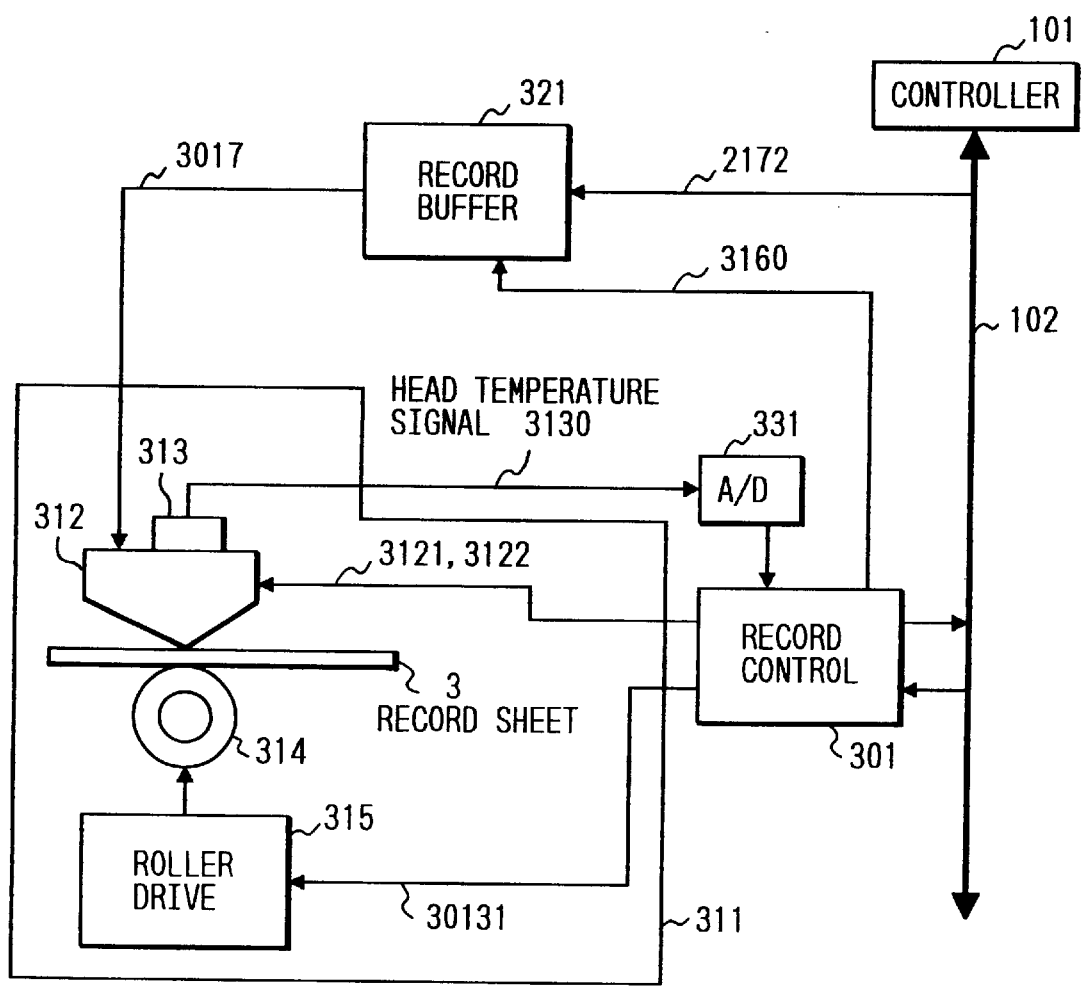
FIG. 5 is a block diagram showing a construction of a record portion 311 of the first embodiment.

In FIG. 5, the record portion 311 comprises a roller drive portion 315 composed of a stepping motor (not shown) and a gear train (not shown), a record head 312 in the form of a thermal line head including a line of heater resistors (not shown) for performing a recording in the main scan direction by heating the resistors, a roller 314 in pressure contact with the record head 312 for transporting a recording sheet 3 in the sub scan direction such that an image is recorded thereon through a thermographical paper which generates colors by heating or an ink ribbon and a thermistor 313 provided on a substrate or a heat sink of the record head 312 for detecting head temperature and outputting a head temperature signal 3130.

The record control portion 301 receives the head temperature signal 3130 from the thermistor 313, after converted into a digital signal by the A/D converter 331 and outputs the motor drive pulse 30131 to the roller drive portion 315 and record strobe pulses 3121 and 3122 to the record portion 311. The record buffer 321 storing the image data 2172 to be recorded outputs an image data 3017 corresponding to 1 line to be recorded in the main scan direction to the record head 312 of the record portion 311.

Figure 6:
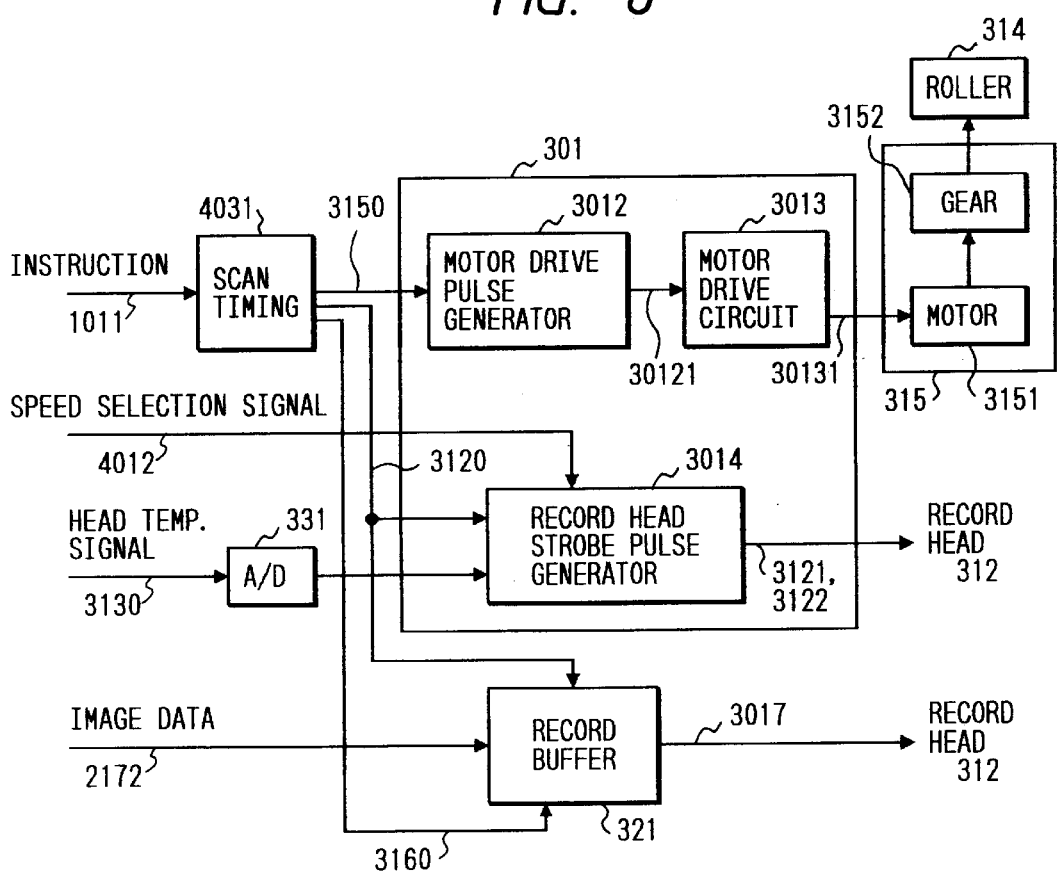
FIG. 6 is a block diagram showing a construction of a record control portion 301 of the first embodiment.

FIG. 6 shows a construction of the record control portion 301 of the first embodiment of the present invention.

In FIG. 6, the record control portion 301 comprises a motor drive pulse generator 3012, a motor drive circuit 3013 and a record strobe pulse generator 3014. In the record control portion 301, a line start pulse 3150 generated by a record scan timing generator 4031 of the mode control portion 401 is supplied to the motor drive pulse generator 3012 and the motor drive pulse 30121 generated by the motor drive pulse generator 3012 is stepped up by the motor drive circuit 3013 and a resultant motor drive pulse 30131 is supplied to a stepping motor 3151 of the roller drive portion 315 to rotate the roller 314 through a gear train 3152 to thereby transport the recording sheet 3 in the sub scan direction. The record head strobe pulse generator 3014 receives the main scan pulse 3120 generated by the record scan timing generator 4031 of the mode control portion 401 and a speed selection signal 4012 generated by the operation mode setting portion (not shown) and outputs the record strobe pulses 3121 and 3122 to the record head 312 so that the image is recorded on the recording sheet 3 in the main scan direction at a predetermined speed every drive of the record head 312. The record buffer 321 receives the main scan pulse 3120 generated by the record scan timing generator 4031 of the mode control portion 401 and the selection signal 3160 and selects from a separately input image data 2172 an image data 3017 to be output to the record head 312.

Figure 7:
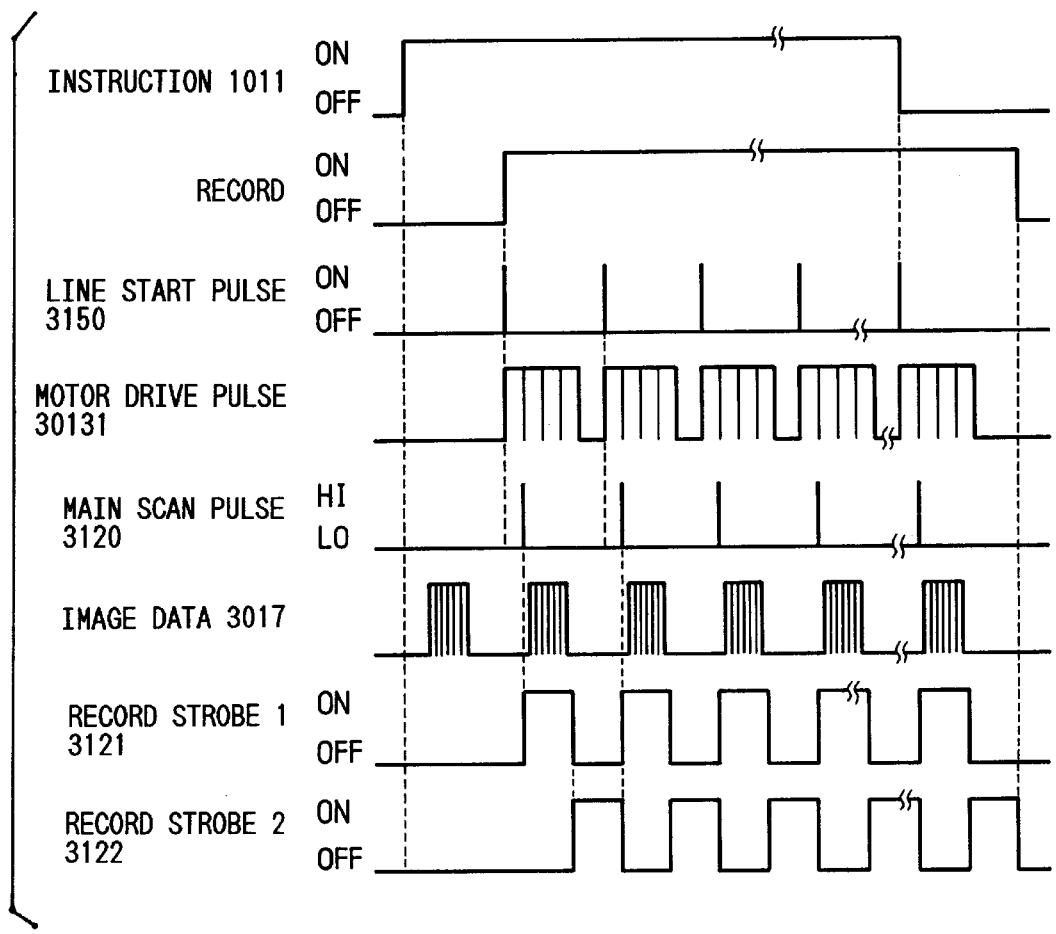
FIG. 7 is a timing chart showing a record operation of the first embodiment.

FIG. 7 shows a timing of the record operation of the first embodiment shown in FIG. 1.

The record sheet 3 is preliminarily set in the record portion 311. The controller 101 outputs an operation start instruction to the mode setting portion (not shown) of the mode control portion 401 and the operation mode setting portion accepts a copy operation according to an operation content of the operation panel 103 and outputs a copy instruction 1011 to the record scan timing generator 4031 of the mode control portion 401.

When the record operation is started, the record portion 311 receives the image data 3017 of the document 2 which was read by the read portion 211 and stored in the record buffer 321, the record scan timing generator 4031 outputs the line start pulse 3150 every sub scan of 1 line and the motor drive circuit 3013 generates the motor drive pulse 30131 to rotate the roller 314. Since there is a time lag between the start of the motor 3151 and an actual start of the recording sheet 3 due to backlash and/or distortion of gear shafts of the gear train, the record scan timing generator 4031 generates the main scan pulse 3120 every line with a slight delay from the line start pulse 3150 and, by supplying the record strobe pulses 3121 and 3122 synchronized with it to the record head 312, it is possible to record the image on the recording sheet 3 in the main scan direction. By repeating this, the image is recorded.

Although the strobe to be supplied to the record head 312 is divided to 2 strobe pulses 3121 and 3122 in the above description, the dividing number may be any dependent on the structure of the record head 312 and the capacity of the recording power source. Further, in this embodiment, the selection signal 3160 is always valid and the image data 3017 is selected in respective sub scans.

Figure 8:
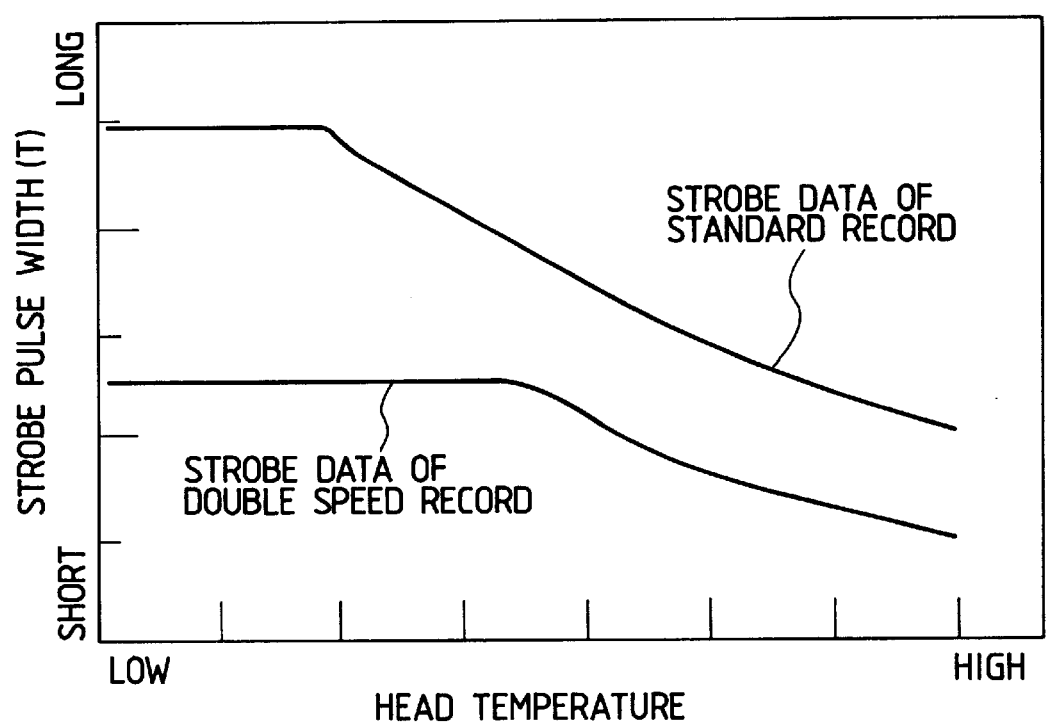
FIG. 8 is a graph showing a characteristics of strobe data stored in a record head strobe pulse generator 3014 shown in FIG. 6.

FIG. 8 shows schematically a strobe data stored in the record head strobe pulse generator 3014 shown in FIG. 6. In FIG. 8, the record head strobe pulse generator 3014 stores strobe data trains corresponding to the standard speed and the twice speed which is selected by the speed selection signal 4012 supplied thereto. The lower the head temperature in recording is the larger the strobe pulse width. When the head temperature is the same, the strobe pulse width during the twice speed recording is smaller than that during the standard speed recording. Further, the strobe pulse width Ws must satisfy the condition:

$Ws \leq ((1$ line sub scan time$)/($strobe dividing number$))$

When the standard speed is 10 ms/line and the strobe dividing number is 2, the strobe pulse width at the standard speed is 5 ms or smaller and that at twice speed is 2.5 ms or smaller.

Figure 9:
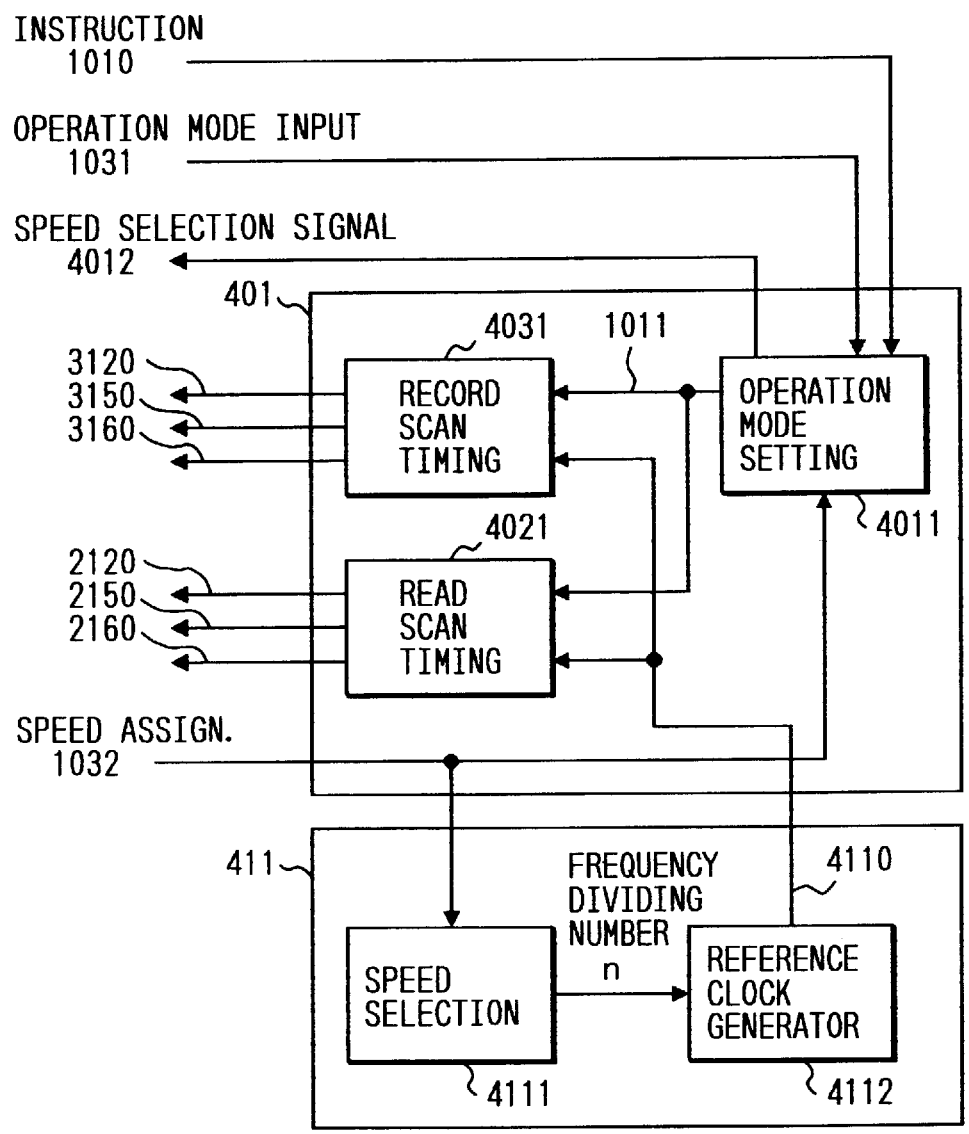
FIG. 9 is a block diagram showing constructions of a mode control portion 401 and a speed switching portion 411 of the first embodiment shown in FIG. 1.

FIG. 9 shows a construction of the mode control portion 401 and the speed switching portion 411 of the first embodiment shown in FIG. 1.

In FIG. 9, the mode control portion 401 comprises a record scan timing generator 4031 which determines an operation timing of the recording operation, a read scan timing generator portion 4021 for determining a timing of the read operation and an operation mode setting portion 4011. The speed switching portion 411 comprises a speed selector 4111 and a reference clock generator 4112.

The operation mode setting portion 4011 responds to an operation start instruction 1010 from the controller 101, an operation mode input 1031 and a speed instruction 1032, the latter two being input through the operation panel 103, to output a copy instruction 1011 to the record scan timing portion 4031 and the read scan timing portion 4021 and output a speed selection signal 4012 to a record head strobe pulse generator 3014. Clock frequency of the reference clock generator 4112 is divided by n which is converted from a speed instructed by the speed instruction 1032 input through the operation panel 103 by the speed selector 4111 and the divided clock frequency is supplied to the record scan timing portion 4031 and the read scan timing portion 4021 as a reference clock for recording and reading operations. For example, assuming n=6 at the standard speed operation, an operation at a speed twice the standard speed is possible with n=3 and an operation at a speed three times the standard speed is possible with n=2.

The record scan timing portion 4031 outputs a line start pulse 3150 and a main scan pulse 3120 to the record control portion 301 and a selection signal 3160 to the record buffer 321. The read scan timing portion 4021 outputs a line start pulse 2120 and a main scan pulse 2150 to the read control portion 201 and a selection signal 2160 to the signal processor 221.

Figure 10:
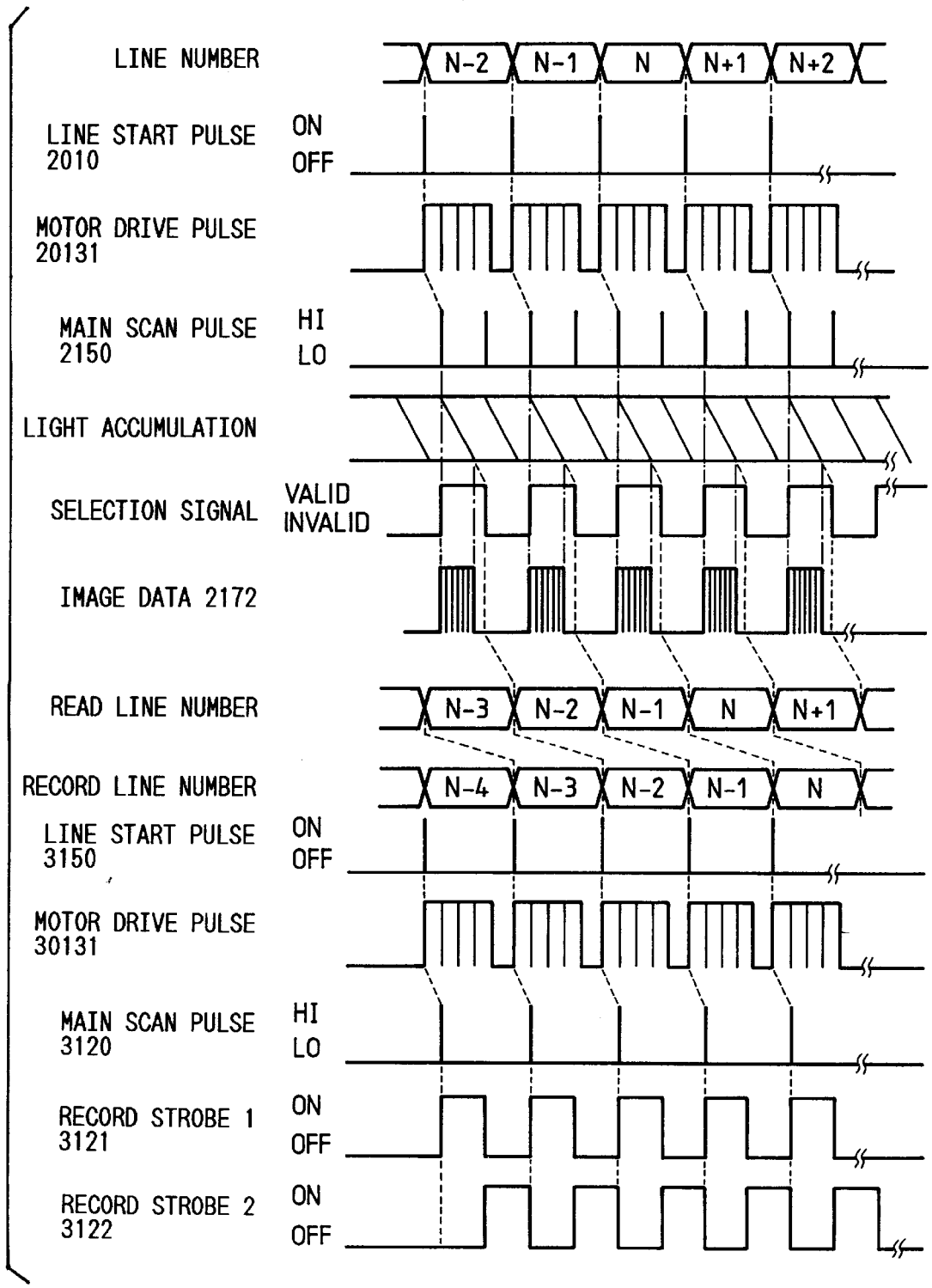
FIG. 10 is a timing chart showing a copying operation of the first embodiment at a standard speed.

Describing an operation of this embodiment, a copying operation is performed by the read portion 211 and the record portion 311 according to a copying timing shown in FIG. 10 at the standard speed.

The read operation is basically performed according to the timing shown in FIG. 4 and the record operation is performed according to the timing shown in FIG. 7. However, lines for which image data obtained by main scan is processed are different between the reading and the recording operations.

In FIG. 10, line numbers N−2 to N+2 for the copying operation managed by the mode control portion 401 are used for example. In the copying operation, the read operation precedes the record operation. The read operation synchronized with the line start pulse 2120 at the line number N−2 is performed twice for 1 line and data obtained by one read operation is invalidated by the selection signal 2160 and the other read operation is made valid. The read of the image signal 2170 (image signal 2171, image data 2172) by means of the read sensor 215 is performed in synchronism with the main scan pulse 2150 for the (N−1)th line since it delays. Further, the record operation responsive to the image data 2172 transferred to the record head 312 is performed by the record strobe pulses 3121 and 3122 synchronized with the main scan pulse 3120 for the Nth line.

When a high quality image data 2172 is to be obtained by processing image signals 2171 for a plurality of lines by means of the binarization circuit 2212, the read line number and the record line number are increased by at least 1 line, respectively.

Figure 11:
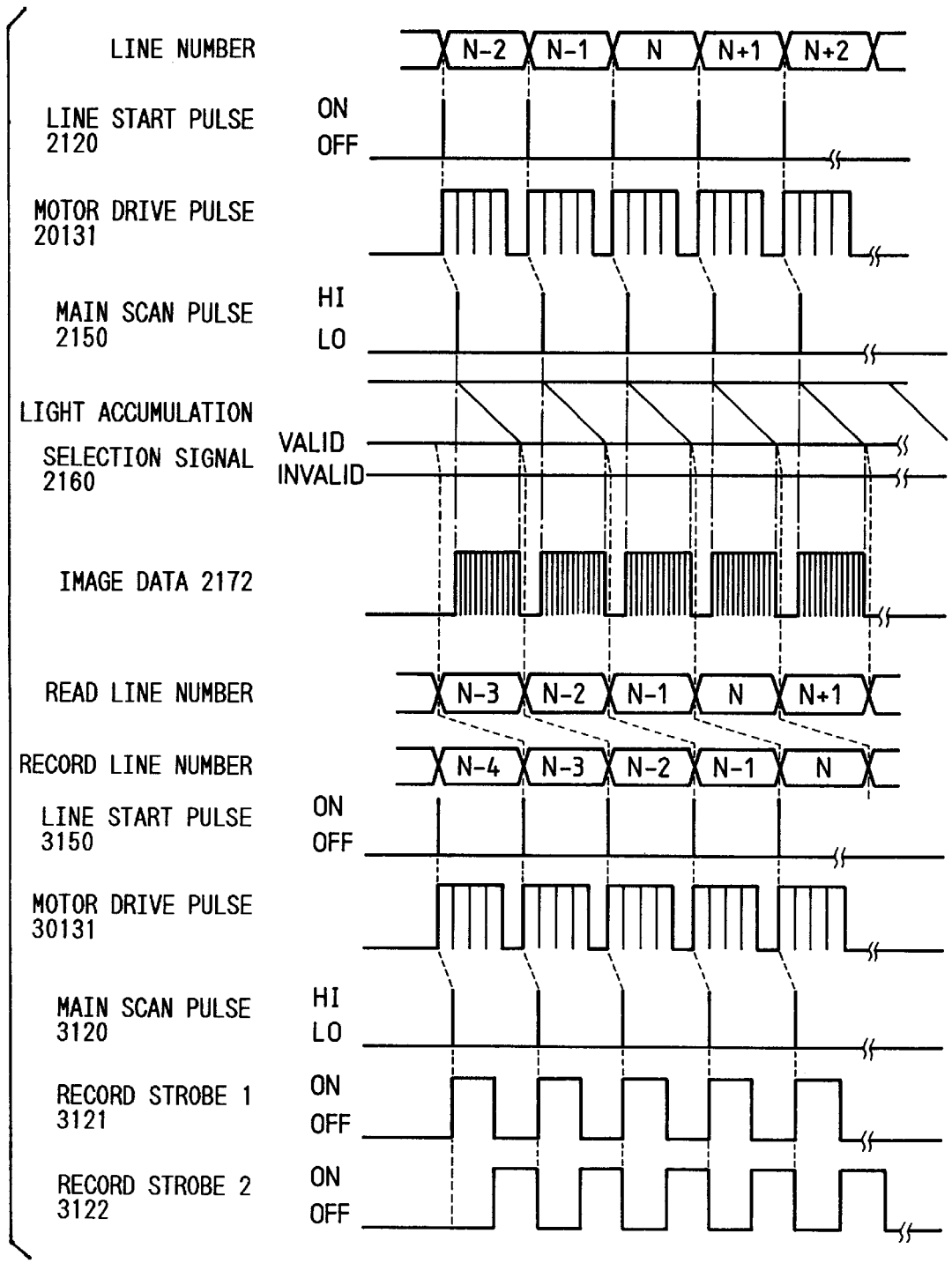
FIG. 11 is a timing chart showing a copying operation of the first embodiment at a high speed.

FIG. 11 shows a timing of a high speed copying operation of the first embodiment shown in FIG. 1. In this embodiment, high speed means a speed twice the standard copying speed. A time axis in FIG. 11 is expanded twice compared with the time axis shown in FIG. 10.

In FIG. 11, line numbers N−2 to N+2 for the copying operation managed by the mode control portion 401 are used for example. In the copying operation, the read operation precedes the record operation as in the case of the standard speed copying operation shown in FIG. 10. A relation between the read line number and the record line number is the same as that in the standard speed copying operation shown in FIG. 10.

Although the record operation timing in FIG. 11 seems to be similar to that shown in FIG. 10, the scanning time in the record operation is a half of that in the standard speed record operation shown in FIG. 10 since the time axis in FIG. 11 is expanded twice as mentioned above.

On the other hand, the read operation is performed with a timing described below. The read operation (main scan) synchronized with the line start pulse 2120 for the line number N−2 (period is a half of that in the read operation shown in FIG. 10) is performed once in 1 line and the selection signal 2160 makes it always valid. The read of the image signal 2170 (image signal 2171, image data 2172) by means of the read sensor 215 is performed in synchronism with the main scan pulse 2150 for the (N−1)th line since it delays. Further, the record operation responsive to the image data 2172 transferred to the record head 312 is performed by the record strobe pulses 3121 and 3122 synchronized with the main scan pulse 3120 for the Nth line.

One read scan time is the same as that in the case of the read operation at the standard speed shown in FIG. 10. That is, the pulse period of the main scan pulse 2150 is common for the twice speed operation shown in FIG. 11 and the standard speed operation shown in FIG. 10. Therefore, an exposing time of the read sensor portion 217 in one read scan in the twice speed operation shown in FIG. 11 is the same as that in the standard speed operation shown in FIG. 10 and thus outputs having same sensitivity are obtained. Accordingly, it is possible to read the image with a constant quality regardless of speed of the copying operation.

According to this embodiment, it is possible to provide an image copying device having two copying speeds, the standard speed and the twice speed, by performing the read operation twice for 1 line in the copying operation at the standard speed and recording data obtained by only one of the two read operations and by performing the read operation once for 1 line in the copying operation at a speed twice the standard speed (that is, with the sub scan time which is a half of that in the case of the standard speed operation) and with the same main scan time as that in the standard speed read operation and recording data obtained by the read operation.

Although, in the first embodiment, the frequency dividing number n in read operations in 1 line at the standard speed is set n=2 and the speed in the high speed mode is made twice the standard speed, it is possible to perform the high speed operation at a speed three times or four times the standard speed, etc., by setting n=3, 4, . . . with the similar timing.

Figure 12:
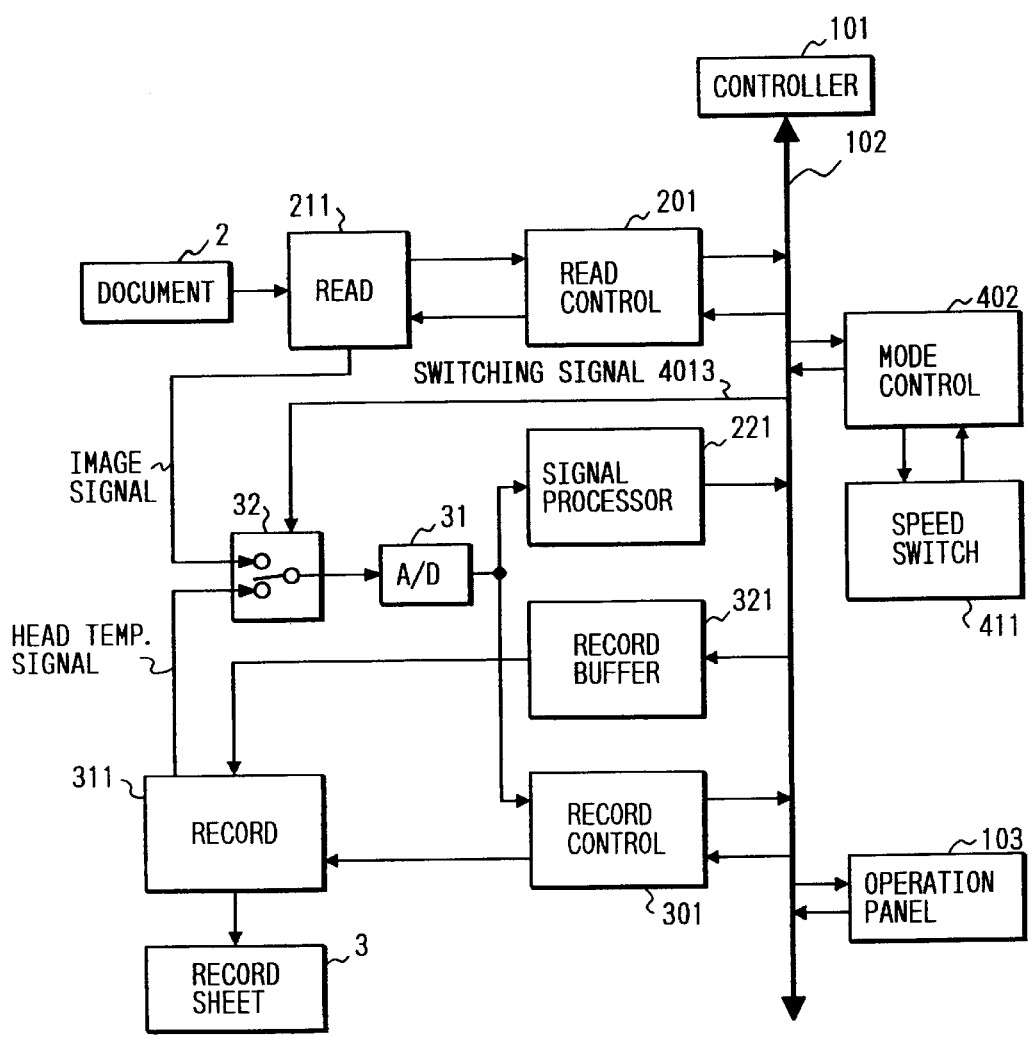
FIG. 12 is a block diagram showing a construction of an image copying device according to a second embodiment of the present invention.

FIG. 12 shows a construction of an image copying device according to a second embodiment of the present invention. The second embodiment differs from the first embodiment shown in FIG. 1 in that a single A/D converter 31 is used instead of the A/D converters 221 and 331 for converting the image signal 2170 and the head temperature signal 3130 into the digital signals, respectively, in FIG. 1 and that a switch 32 for selecting one of the the image signal 2170 and the head temperature signal 3130 according to a switching signal 4013 and outputting the selected one signal to the single A/D converter 31 is provided in an input side of the A/D converter 31 so that an output of the A/D converter 31 is supplied to the signal processor 221 and the record control portion 301.

Figure 13:
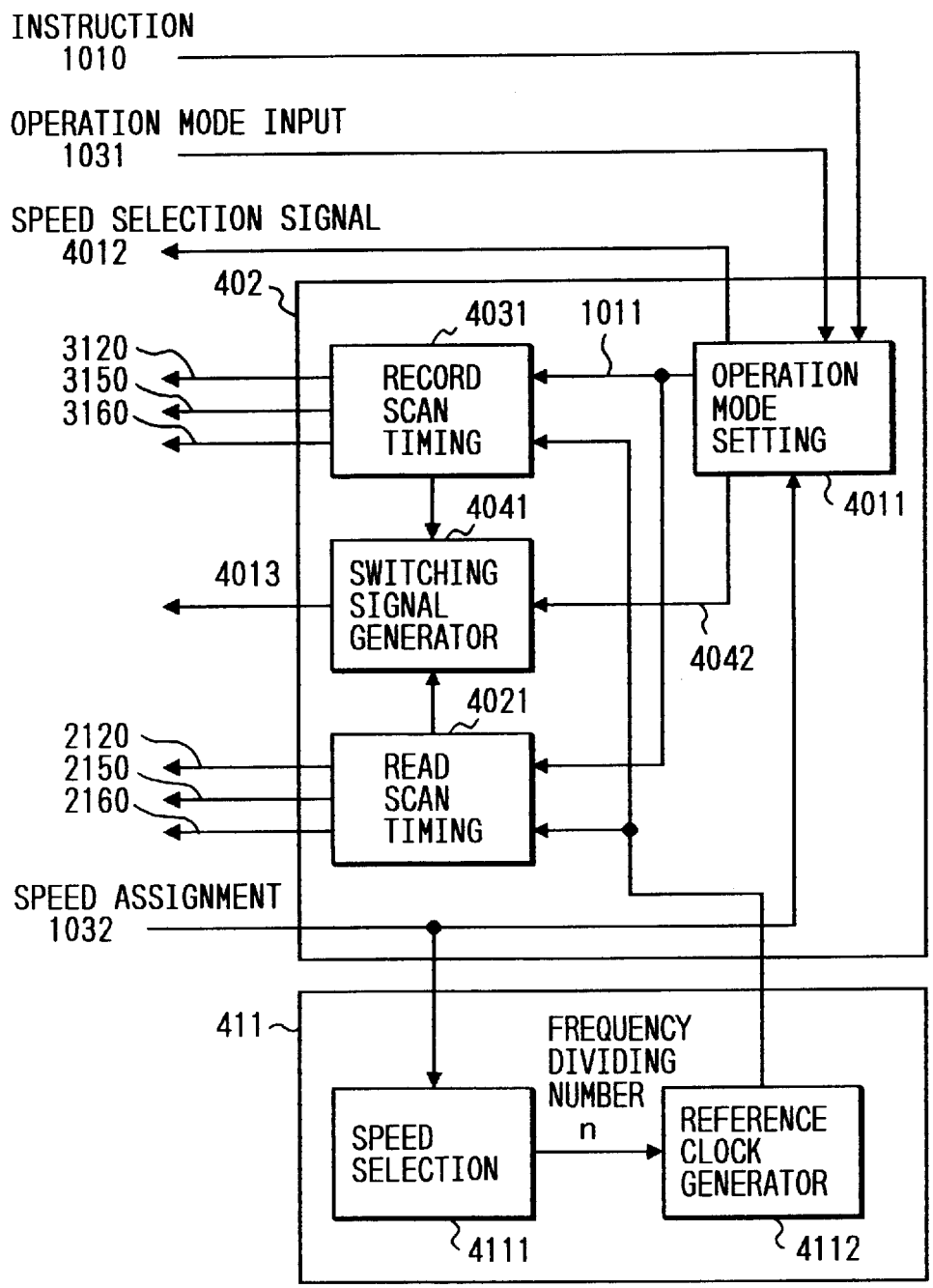
FIG. 13 is a block diagram showing constructions of a mode control portion 402 and a speed switching portion 411 of the first embodiment shown in FIG. 12.

FIG. 13 shows constructions of a mode control portion 402 and a speed switching portion 411 of the second embodiment shown in FIG. 12.

In FIG. 13, the mode control portion 402 comprises a record scan timing generator 4031 which determines an operation timing of the recording operation, a read scan timing generator portion 4021 for determining a timing of the read operation, an operation mode setting portion 4011 and a switching signal generator 4041 for generating a switch signal for switching the switch 32. The speed switching portion 411 comprises a speed selector 4111 and a reference clock generator 4112.

The operation mode setting portion 4011 responds to an operation start instruction 1010 from the controller 101, an operation mode input 1031 and a speed instruction 1032, the latter two being input through the operation panel 103, to output a copy instruction 1011 to the record scan timing portion 4031 and the read scan timing portion 4021 and output a speed selection signal 4012 to a record head strobe pulse generator 3014 and a timing signal 4042 to the switching signal generator 4041. Clock frequency of the reference clock generator 4112 is divided by n which is converted from a speed instructed by the speed instruction 1032 input through the operation panel 103 by the speed selector 4111 and the divided clock frequency is supplied to the record scan timing portion 4031 and the read scan timing portion 4021 as a reference clock for recording and reading operations. For example, assuming n=6 at the standard speed operation, an operation at a speed twice the standard speed is possible with n=3 and an operation at a speed three times the standard speed is possible with n=2.

The record scan timing portion 4031 outputs a line start pulse 3150 and a main scan pulse 3120 to the record control portion 301 and a selection signal 3160 to the record buffer 321. The read scan timing portion 4021 outputs a line start pulse 2120 and a main scan pulse 2150 to the read control portion 201 and a selection signal 2160 to the signal processor 221. The switching signal generator 4041 outputs a switching signal 4013 to the switch 32.

Figure 14:
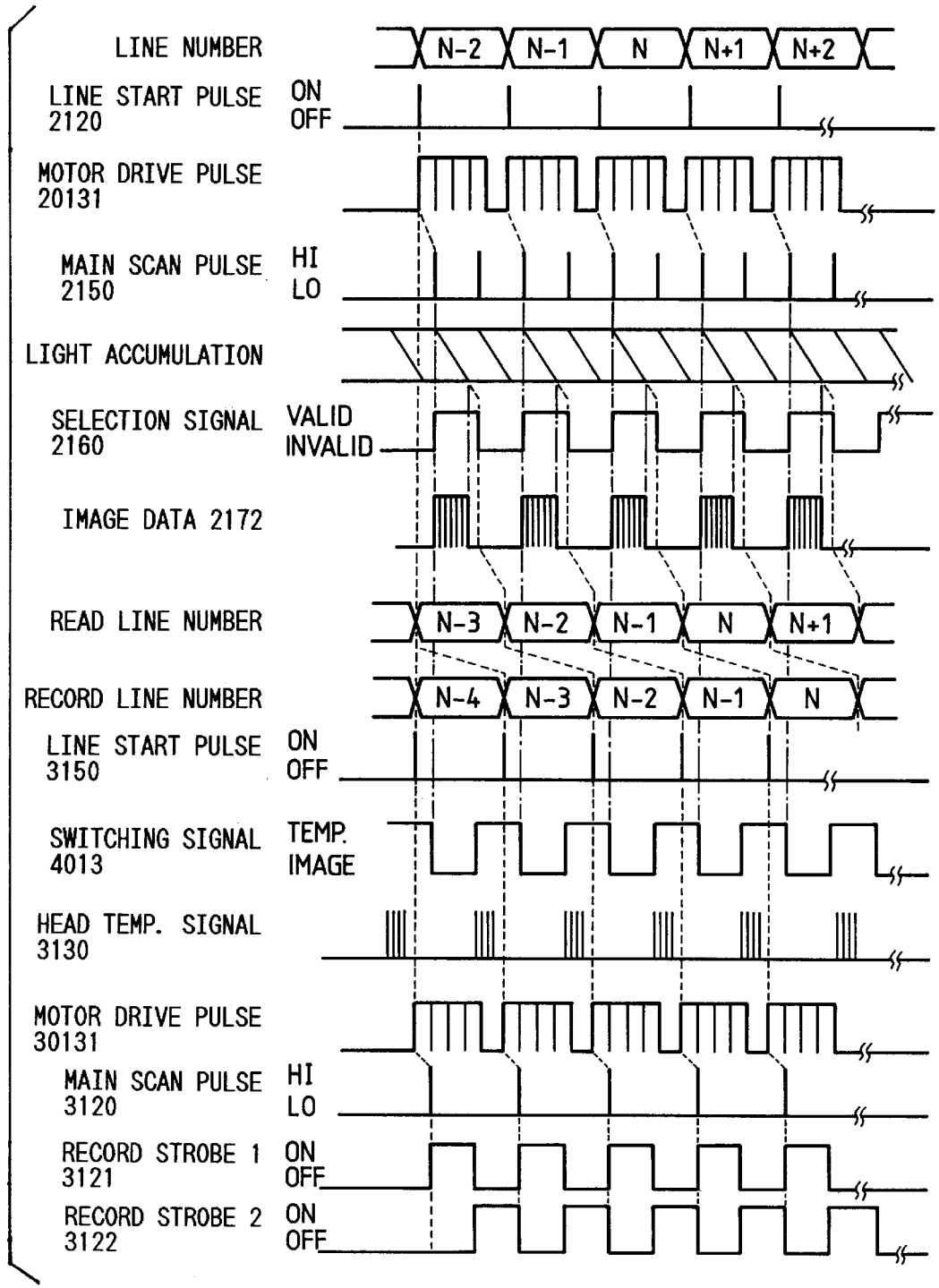
FIG. 14 is a timing chart showing a copying operation of the second embodiment at a standard speed.

Describing an operation of the second embodiment, a copying operation is performed by the read portion 211 and the record portion 311 according to a copying timing shown in FIG. 14 at the standard speed.

The read operation is basically performed according to the timing shown in FIG. 4 and the record operation is performed according to the timing shown in FIG. 7. However, lines for which image data obtained by main scan is processed are different between the reading and the recording operations, as in the case of the first embodiment shown in FIG. 1. However, in the second embodiment, a detection and processing of either the image signal 2170 or the head temperature signal 3130 from the switch 32 at an appropriate timing are required.

In FIG. 14, line numbers N−2 to N+2 for the copying operation managed by the mode control portion 401 are used for example. In the copying operation, the read operation precedes the record operation. The read operation synchronized with the line start pulse 2120 at the line number N−2 is performed twice for 1 line and data obtained by one read operation is invalidated by the selection signal 2160 and the other read operation is made valid. The read of the image signal 2170 (image signal 2171, image data 2172) by means of the read sensor 215 is performed in synchronism with the main scan pulse 2150 for the (N−1)th line since it delays. The switching signal 4013 can read the head temperature signal 3130 during the read scan period which is invalid, by switching the switch to the side of the image signal 2170 during the read period of the image signal 2170 which is valid and to the side of the head temperature signal 3130 during the read scan period which is invalid. Further, the record operation responsive to the image data 2172 transferred to the record head 312 is performed by the record strobe pulses 3121 and 3122 synchronized with the main scan pulse 3120 for the Nth line. In this case, it is possible to perform a suitable record with a strobe pulse width corresponding to the head temperature every line by selecting one of the strobe data from the record head strobe data generator 3014 shown in FIG. 8 according to the detected head temperature signal 3130.

Figure 15:
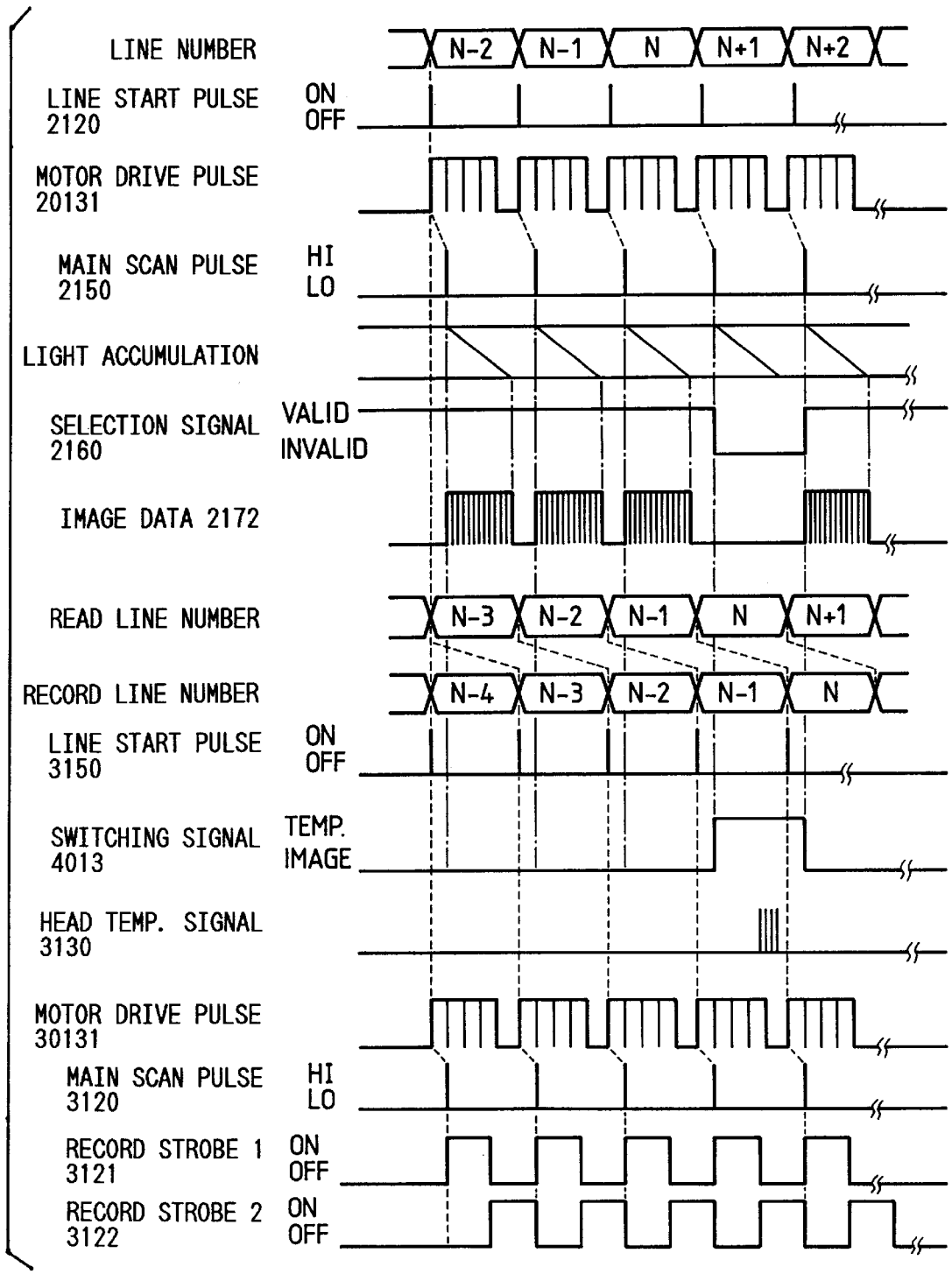
FIG. 15 is a timing chart showing a copying operation of the second embodiment at a high speed.

FIG. 15 shows a timing of the copying operation of the second embodiment shown in FIG. 12 at high speed which is twice the standard speed. A time axis in FIG. 15 is expanded twice compared with the time axis shown in FIG. 14.

In FIG. 15, line numbers N−2 to N+2 for the copying operation managed by the mode control portion 401 are used for example. In the copying operation, the read operation precedes the record operation as in the case of the standard speed copying operation shown in FIG. 14. A relation between the read line number and the record line number is the same as that in the standard speed copying operation shown in FIG. 14.

Although the record operation timing in FIG. 15 seems to be similar to that shown in FIG. 14, the scanning time in the record operation is a half of that in the standard speed record operation shown in FIG. 14 since the time axis in FIG. 15 is expanded twice as mentioned above. Further, since, in switching between the image signal 2170 and the head temperature signal 3130 by the switch 32, only the image read scan is possible during the sub scan time of 1 line, a sub scan line is provided for reading only the head temperature signal 3130 every N lines (N is an integer larger than 1) so that record data in the sub scan line is interpolated by continuously recording data of a preceding line (N−1).

Now, an operation will be described. The read operation (main scan) synchronized with the line start pulse 2120 for the line number N−2 (period is a half of that in the read operation shown in FIG. 10) is performed once in 1 line and the selection signal 2160 makes it always valid. The read of the image signal 2170 (image signal 2171, image data 2172) by means of the read sensor 215 is performed in synchronism with the main scan pulse 2150 for the (N−1)th line since it delays. Further, the record operation responsive to the image data 2172 transferred to the record head 312 is performed by the record strobe pulses 3121 and 3122 synchronized with the main scan pulse 3120 for the Nth line.

For the (N+1)th line, the head temperature signal 3130 is selected by the switching signal and it is read by setting the selection signal 2160 invalid. In this case, image data 2170 of the Nth read line scanned becomes invalid and so an image signal 2170 corresponding to 1 line can not be obtained. Therefore, the image signal 2170 corresponding to the (N−1) line which is read out in the preceding line is re-used as a record data of the Nth record line. When the head temperature signal 3130 is read, the strobe pulse width in the record head strobe pulse generator 3014 is changed according to the head temperature signal 3130 and the recording operation is performed with the changed strobe pulse width until the head temperature signal 3130 is read again in the (2N+1)th line.

One read scan time is the same as that in the case of the read operation at the standard speed shown in FIG. 14. That is, the pulse period of the main scan pulse 2150 is common for the twice speed operation shown in FIG. 15 and the standard speed operation shown in FIG. 14. Therefore, an exposing time of the read sensor portion 217 in one read scan in the twice speed operation shown in FIG. 15 is the same as that in the standard speed operation shown in FIG. 14 and thus outputs having same sensitivity are obtained. Accordingly, it is possible to read the image with a constant quality regardless of speed of the copying operation as in the first embodiment shown in FIG. 1.

According to the second embodiment, it is possible to provide an image copying device having two copying speeds, the standard speed and the twice speed, in which, in a copying operation at the standard speed, a recording operation which is temperature-controlled every line is possible by reading 1 line in the copying operation at the standard speed twice, making data obtained by only one of the two read operations valid and data obtained by the other read operation invalid, recording the valid data and reading the head temperature when the data is invalid and in which, in a copying operation at the speed twice the standard speed, the read operation is performed once for 1 line by making the sub scan time a half of that at the standard speed (making the speed twice the standard speed) while using the same main scan time as that in the standard speed read operation, reading the head temperature every N lines to interpolate the record data with the preceding value and performing a record according to the head temperature read out every N lines.

Although, in the second embodiment, the number n of read operations in 1 line at the standard speed is set n=2 and the speed in the high speed mode is made twice the standard speed as in the first embodiment, it is also possible to perform the high speed operation at a speed three times or four times the standard speed, etc., by setting n=3, 4, . . . with the similar timing. Further, although the second embodiment is featured by that the recording of 1 line for N lines is performed at the high speed with line density which is a half of that in the standard speed, it is possible to obtain substantially the same recording quality as that in the standard speed copying operation by making the value of N large. In addition, since only one A/D converter is required, it is possible to reduce the cost of the copying device.

Summarizingly, according to the first and second embodiments, the following advantages are obtained:

(1) In the read operation by the read portion, same read image quality is obtained regardless of the copying speed.

(2) In the record operation, influence of the operating speed on the record quality is minimized.

Although the second embodiment is satisfactory practically, it has a potential problem that the record quality is degraded due to the facts that, since the reading of the temperature by means of the thermistor is performed every N lines, there may be a case where data recording can not follow increase of temperature precisely and that, since the line density in the sub scan direction becomes twice every N lines, the record quality may be degraded.

However, in a case of a copying device of, for example, 200 dpi (Dot per Inch), it has been known by experiments that increase of temperature of the recording head is 0.2 to 0.5° C./cm at most when all dots are printed black and temperature resolution is about 1° C. by A/D conversion of 6 bits in a range of temperature of the device in usual use (5° to 60° C.), which is substantially the same as that when temperature is detected every line for control purpose and that, since width of 1 line in the sub scan direction is in the order of 130 microns, it is difficult to distinguish a line having width of 260 microns which exists every several centimeters. Therefore, such potential problem can be ignored practically.

Figure 16:
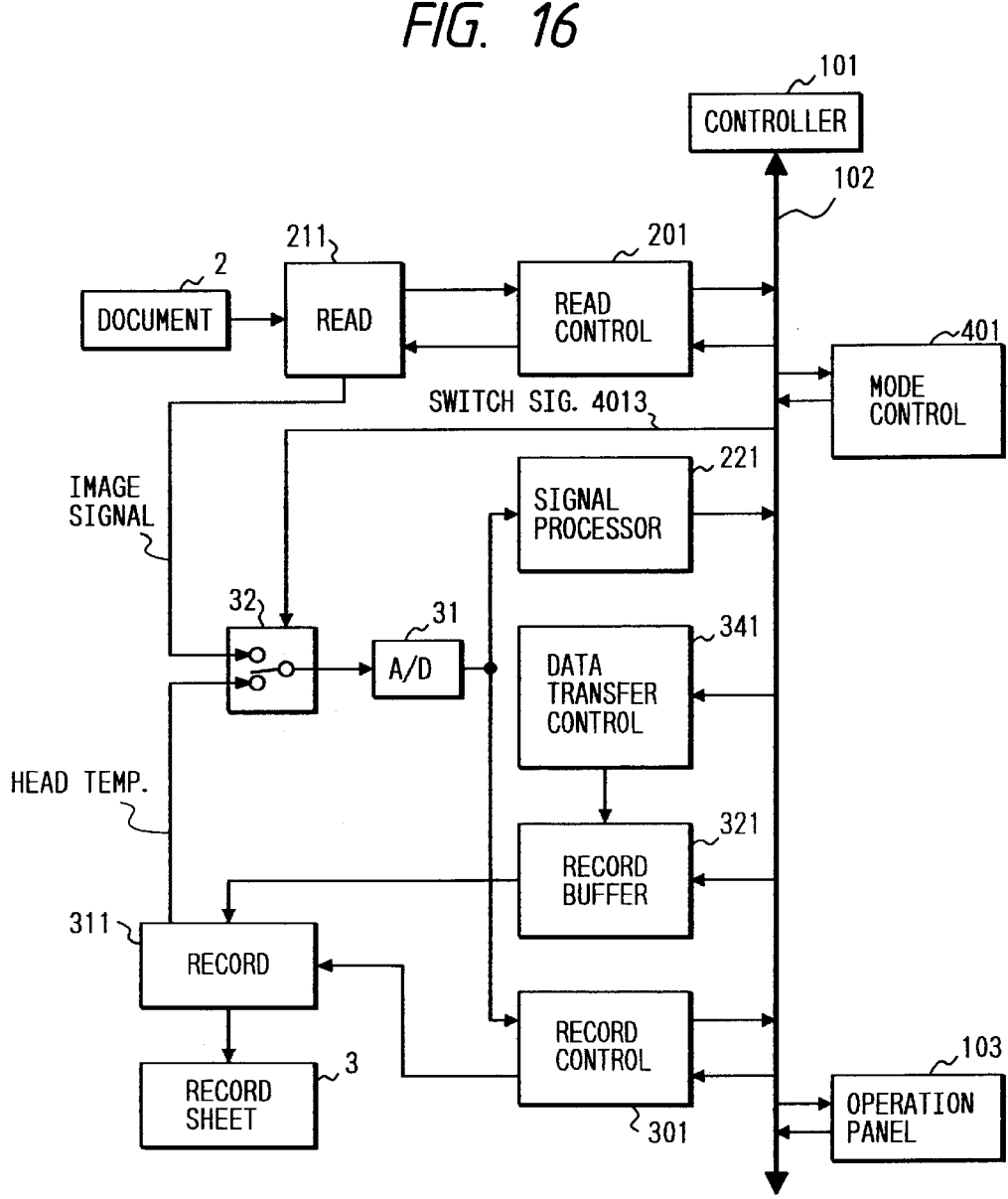
FIG. 16 is a block diagram showing a copier according to a third embodiment of the present invention.

FIG. 16 is a block diagram of a copying device according to a third embodiment of the present invention. The third embodiment differs from the second embodiment shown in FIG. 12 in mainly that the speed switching portion 411 of the second embodiment is removed and, instead, a data transfer control portion 341 for controlling transfer of the record data 3210 corresponding 1 line to be recorded from the record buffer 321 to the record head 312 is added.

Figure 17:
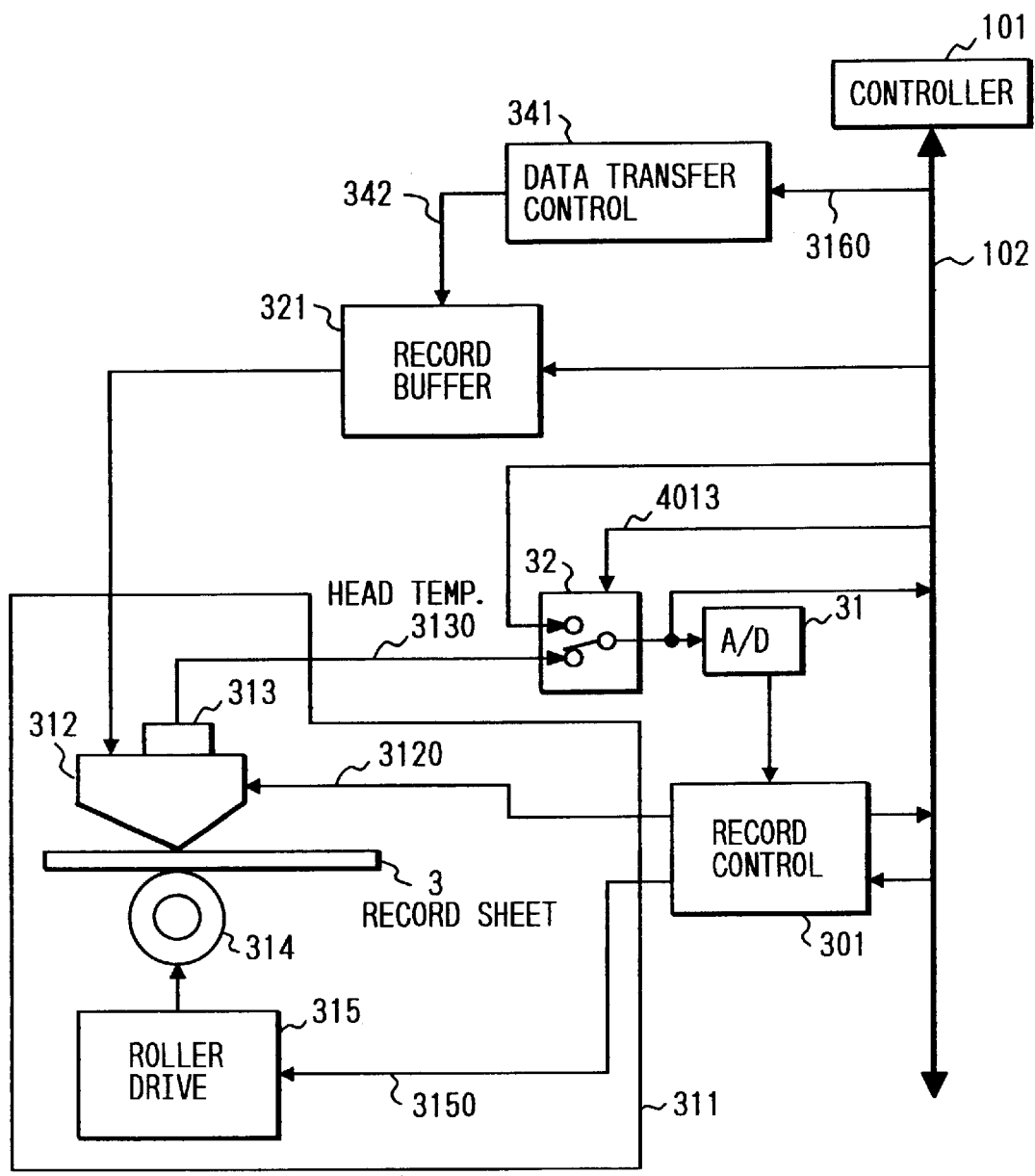
FIG. 17 is a block diagram of a record portion 311 of the the copier shown in FIG. 16.

FIG. 17 shows constructions of a record portion 311 of the third embodiment shown in FIG. 16.

In FIG. 17, the record portion 311 comprises a roller drive portion 315, a record head 312, a roller 314 in pressure contact with the record head 312, a thermistor 313 provided on the record head 312 for detecting temperature of a substrate of the record head 312, a record control portion 301 responsive to the head temperature for controlling the record portion 311 suitably to perform a record operation, a record buffer 321 for storing image data to be recorded, a transfer control portion 341 for controlling a transfer of the record data in the record buffer 321 to the record head 312, a mode control portion 401 for controlling a read control portion 201 and a record control portion 301 according to an operation mode instructed from an operation panel 103, a selector 32 for selecting one of the image output read by the record portion 211 and the temperature output from the thermistor according to a switching signal 4013 and an A/D converter 31 for converting an output of the selector 32 into a digital data.

The record portion 311 includes a roller drive portion 315 composed of a stepping motor 3151 and a gear train 3152, the record head 312 for performing a record in a main scan direction by heating a line of heating resistors, a roller 314 in pressure contact with the record head 312 through a thermographical paper or ink ribbon and a record sheet 3 for transporting the record sheet 3 in a sub scan direction and the thermistor 313.

Figure 18:
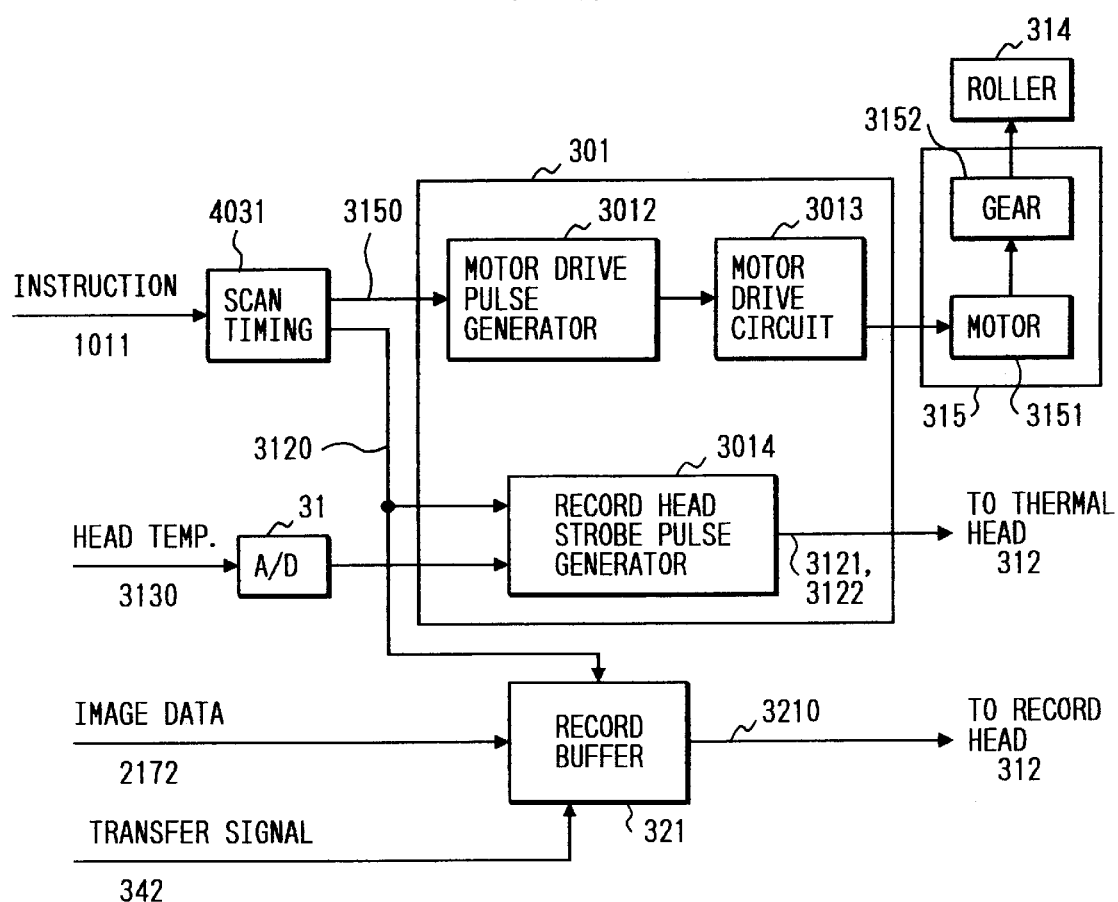
FIG. 18 is a block diagram of a record control portion 301 of the the copier shown in FIG. 16.
Figure 19:
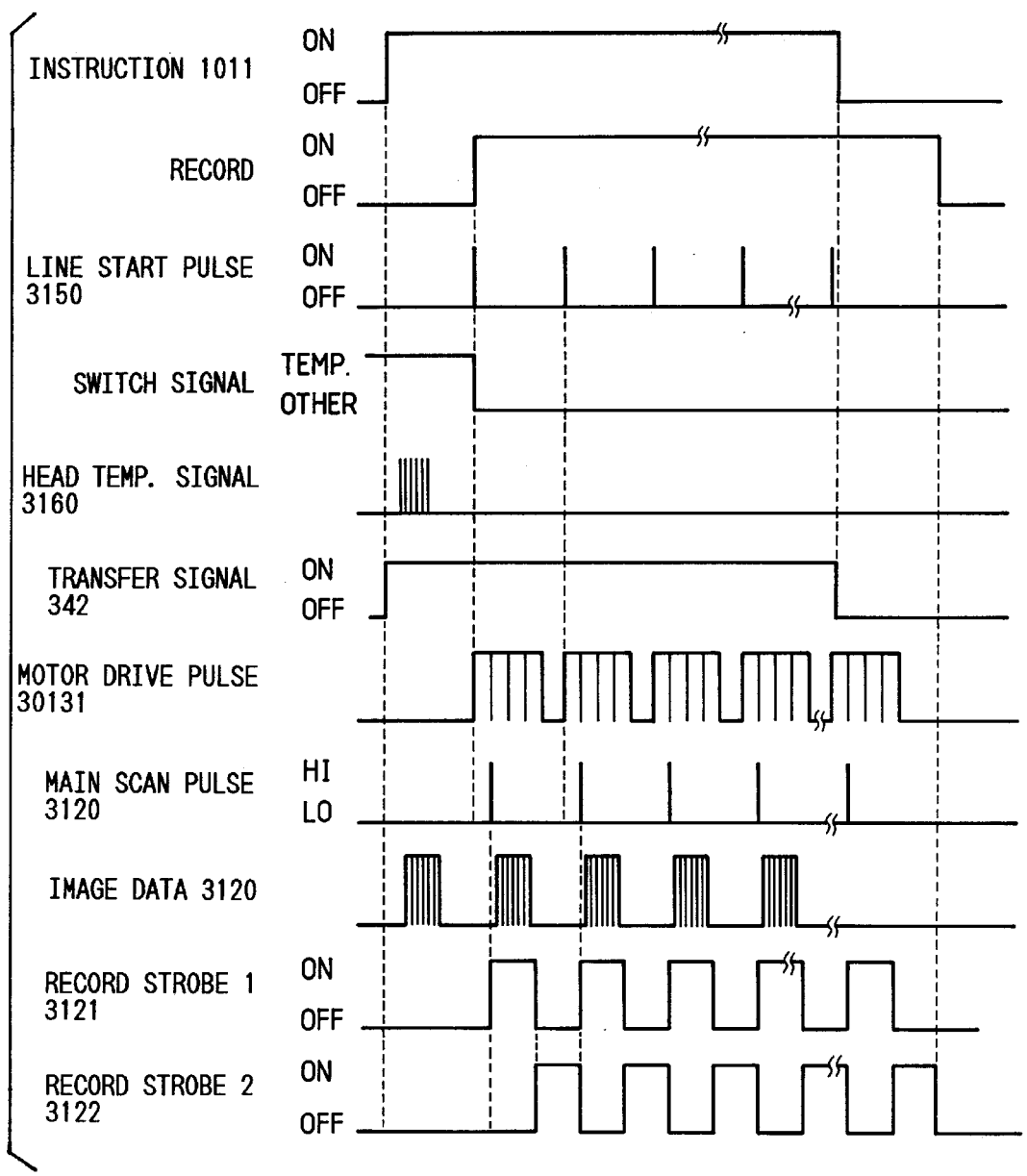
FIG. 19 is a timing chart showing a recording operation of the third embodiment.

FIG. 18 shows a construction of the record control portion 301 and FIG. 19 shows an operation timing of the construction shown in FIG. 18.

In FIGS. 18 and 19, the record control portion 301 comprises a motor drive pulse generator 3012, a motor drive circuit 3013 and a record head strobe pulse generator circuit 3014. In the record portion, a line start pulse 3150 generated by a record scan timing generator 4031 of the mode control portion 401 is supplied to the motor drive pulse generator 3012 and a motor drive pulse 30131 generated thereby is stepped up by the motor drive circuit 3013 and sent to the motor 3151 of the roller drive portion 315 to rotate the roller 314 to thereby transport the record sheet 3 in the sub scan direction. The record head strobe pulse generator circuit 3014 responds to the main scan pulse 3120 from the record scan timing generator 4031 of the mode control portion 401 and the head temperature signal 3130 from the A/D converter 31 to output record strobes 3121 and 3122 to the thermal head 312 so that the image is record on the record sheet 3 in the main scan direction at a predetermined speed every drive of the thermal head 312. The main scan pulse 3120 is also supplied to the record buffer 321 which also receives the transfer signal 342 and the image data 2172 and selects one of them.

The record sheet 3 is preliminarily set in the record portion 311. The controller 101 accepts a copying operation according to an instruction from the operation panel 103 and outputs a copying instruction 1011 to the mode control portion 401. When the record operation is started, the record portion 311 reads the temperature 3130 first. The image data 2172 of the original 2 which was read by the read portion 211 and stored in the record buffer 321 is supplied to the thermal head 312 as the record data 3210 and the line start pulse 3150 is output every sub scan of 1 line to generate the motor drive pulse 30131 to thereby rotate the roller 314.

Since there is a time lag between the start of the motor 3151 and an actual start of the recording sheet 3 due to backlash and/or distortion of gear shafts of the gear train, the record scan timing generator 4031 generates the main scan pulse 3120 every line with a slight delay from the line start pulse 3150 and, by supplying the record strobes 3121 and 3122 synchronized with it to the record head 312, it is possible to record the image on the recording sheet 3 in the main scan direction. By repeating this, the image is recorded.

Although the strobe to be supplied to the record head 312 is divided to 2 strobes 3121 and 3122 in the above description, the dividing number may be any dependent on the structure of the record head 312 and the capacity of the recording power source.

Further, in this embodiment, the head temperature 3130 is read only immediately before the start of recording and the record is performed by using the strobe data 3121 and 3122 based on the head temperature until a record of one sheet completes. Since there is no need of A/D conversion of the head temperature during the recording operation, the A/D converter 32 can be used for another purpose.

Figure 20:
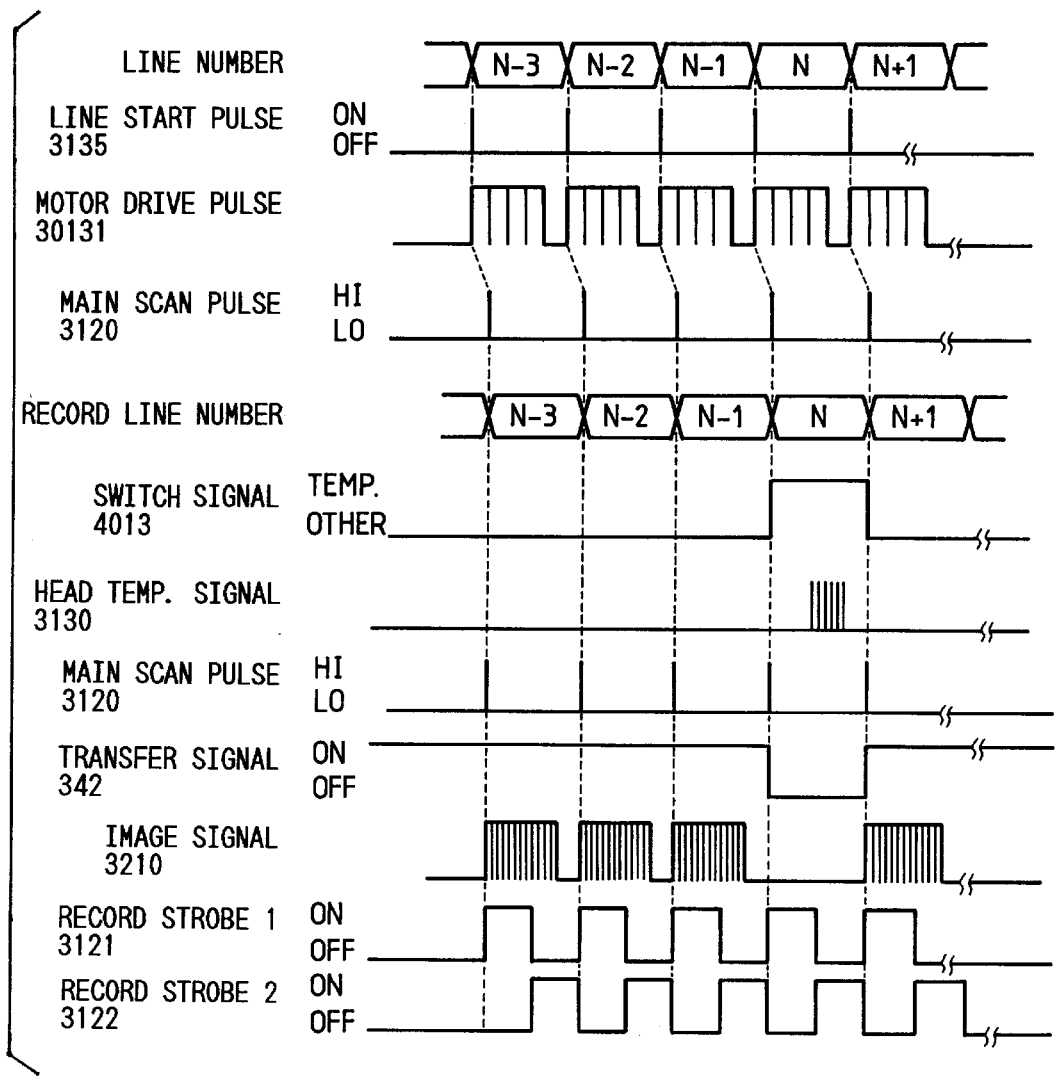
FIG. 20 is another timing chart showing a recording operation of the third embodiment.

FIG. 20 shows another timing chart of a record operation of the third embodiment shown in FIG. 16.

The record sheet 3 is preliminarily set in the record portion 311. The controller 101 accepts a copying operation according to an instruction from the operation panel 103 and outputs a copying instruction 1011 to the mode control portion 401. When the record operation is started, the record portion 311 reads the temperature 3130 first. The image data 2172 of the original 2 which was read by the read portion 211 and stored in the record buffer 321 is supplied to the thermal head 312 as the record data 3210 and the line start pulse 3150 is output every sub scan of 1 line to generate the motor drive pulse 30131 to thereby rotate the roller 314. Since there is a time lag between the start of the motor 3151 and an actual start of the recording sheet 3 due to backlash and/or distortion of gear shafts of the gear train, the record scan timing generator 4031 generates the main scan pulse 3120 every line with a slight delay from the line start pulse 3150 and, by supplying the record strobes 3121 and 3122 from the record strobe pulse generator circuit 3014 to the record head 312, it is possible to record the image on the recording sheet 3 in the main scan direction. By repeating this, the image is recorded.

In the record timing shown in FIG. 20, the record of the (N−1)th line is performed and, at a start of the Nth line, the switching signal 4013 is switched by the selector 32 to the side of head temperature to obtain the temperature signal 3130 and the strobe data based on the temperature signal is determined by the record head strobe pulse generator circuit 3014. During the record of the Nth line, the transfer signal 342 from the data transfer portion 341 is made OFF to stop the transfer of the record data 3210 to the thermal head 312 to print the same record data as that of the preceding (N−1)th line is continuously printed since there is no change of record data (interpolation with preceding value).

By repeating the record operation every N lines, the image is recorded.

According to the operation timing shown in FIG. 20, the head temperature is read immediately before the start of recording operation and every N lines to change the strobe data. Therefore, it is possible to perform a high quality print control dependent on the head temperature.

Figure 21:
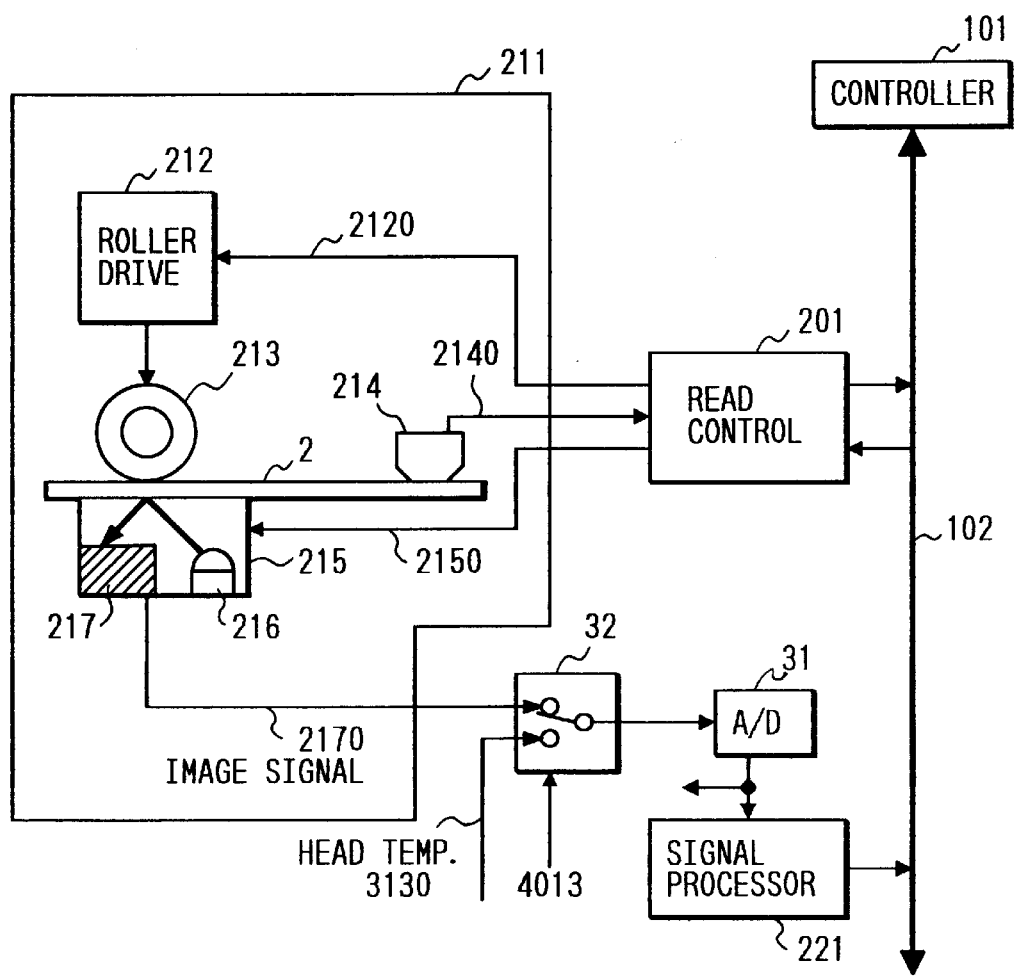
FIG. 21 is a block diagram of a read portion 211 of the the third embodiment shown in FIG. 16.

FIG. 21 shows a construction of the read portion 211 shown in FIG. 16.

The read portion 211 comprises a roller drive portion 212 composed of a stepping motor 2121 as a driving source and a gear train 2122 as a driving force transmission, a read sensor 215 composed of a sensor portion 217 including a photoelectric element and a light source 216 for reading an image of the original 2 in a main scan direction, a roller 213 in pressure contact with the read sensor 215 for transporting the original 2 in a sub scan direction and an original position detector 214 provided in an upstream side of the read portion 215 for detecting a pass of the document 2.

The read control portion 201 supplies a line start pulse 2120 to the roller drive portion 212 and a main scan pulse 2150 to the read portion 215 and receives the original position signal 2140 from the document position detector 214. The selector 32 is switched by the switching signal 4013 to the other side to pass the read image signal 2170 to the A/D converter 31 and the digitized image signal from the A/D converter 31 is supplied to the signal processor 221.

Figure 22:
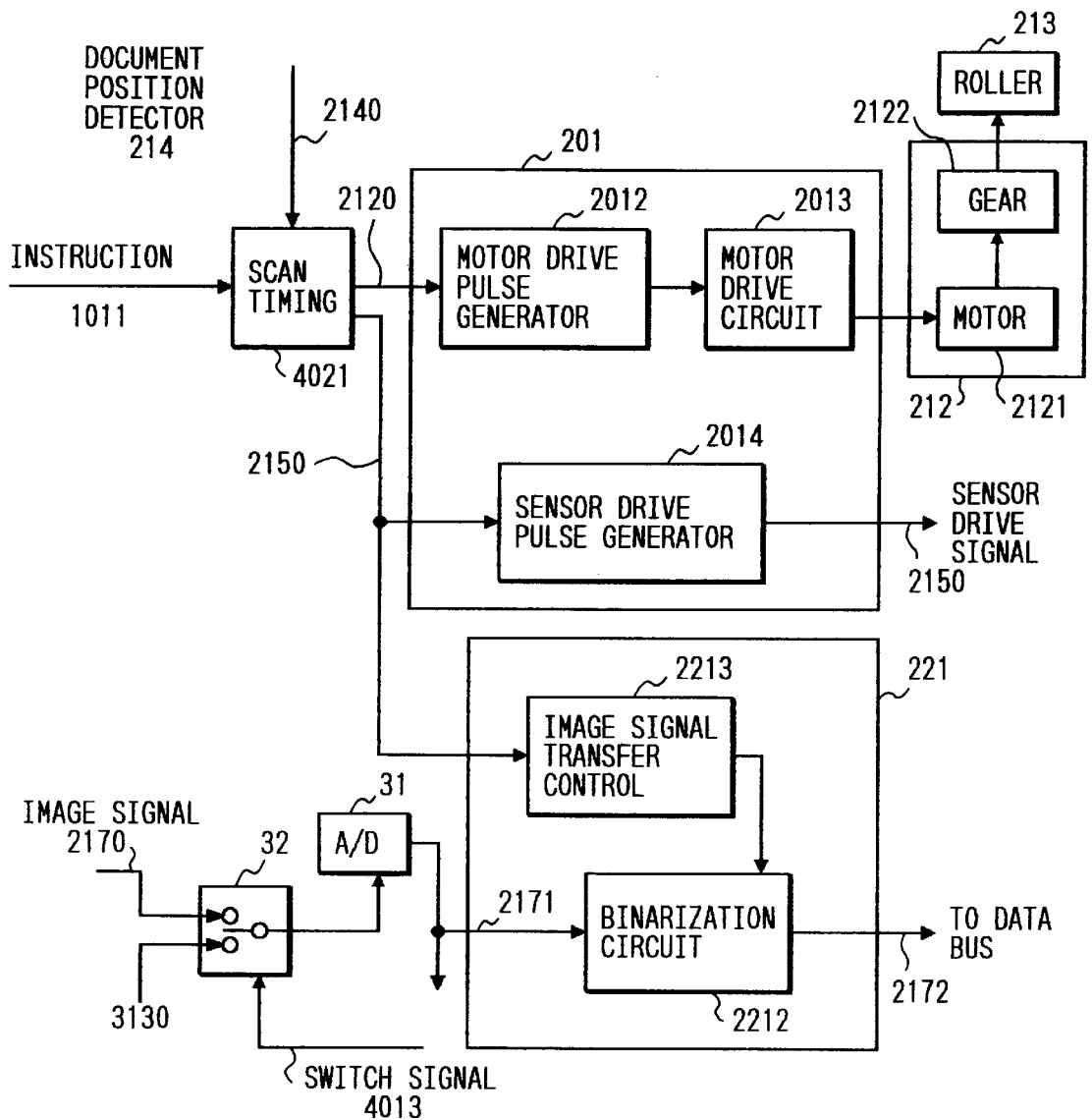
FIG. 22 is a block diagram of a read control portion 201 and a signal processor 221 of the the third embodiment shown in FIG. 16.

FIG. 22 shows details of the read control portion 201 and the signal processor 221 of the device shown in FIG. 16.

The read portion 201 comprises a motor drive pulse generator 2012, a motor drive circuit 2013 and a sensor drive pulse generator 2014. The signal processor 221 comprises an image signal transfer controller 2213 and a binarization circuit 2212. In the read control portion 201, a line start pulse 2120 from a read scan timing generator 4021 is input to the motor drive pulse generator 2012 a motor drive pulse 20121 from which is stepped up by the motor drive circuit 2013 and supplied to a stepping motor 2121 of the roller drive portion 212 to rotate the roller 213 to thereby transport the document 2 in the sub scan direction.

A main scan pulse 2150 output from the read scan timing generator 4021 of the mode control portion 401 is supplied to the sensor drive pulse generator 2014 to drive the read sensor 215 to thereby read the image on the original 2 in the main scan direction for every input of the sensor drive signal 2151. The signal processor 221 responds to the main scan pulse 2150 from the read scan timing generator 4021 and the image signal 2171 which is obtained by digitizing the image signal 2170 from the selector 32 switched thereto by the switching signal 4013 through the A/D converter 32 and supplies it to the data bus 102 as the image data 2172 after binarized by the binarization circuit 2212 and stored in the record buffer 321 sequentially.

Figure 23:
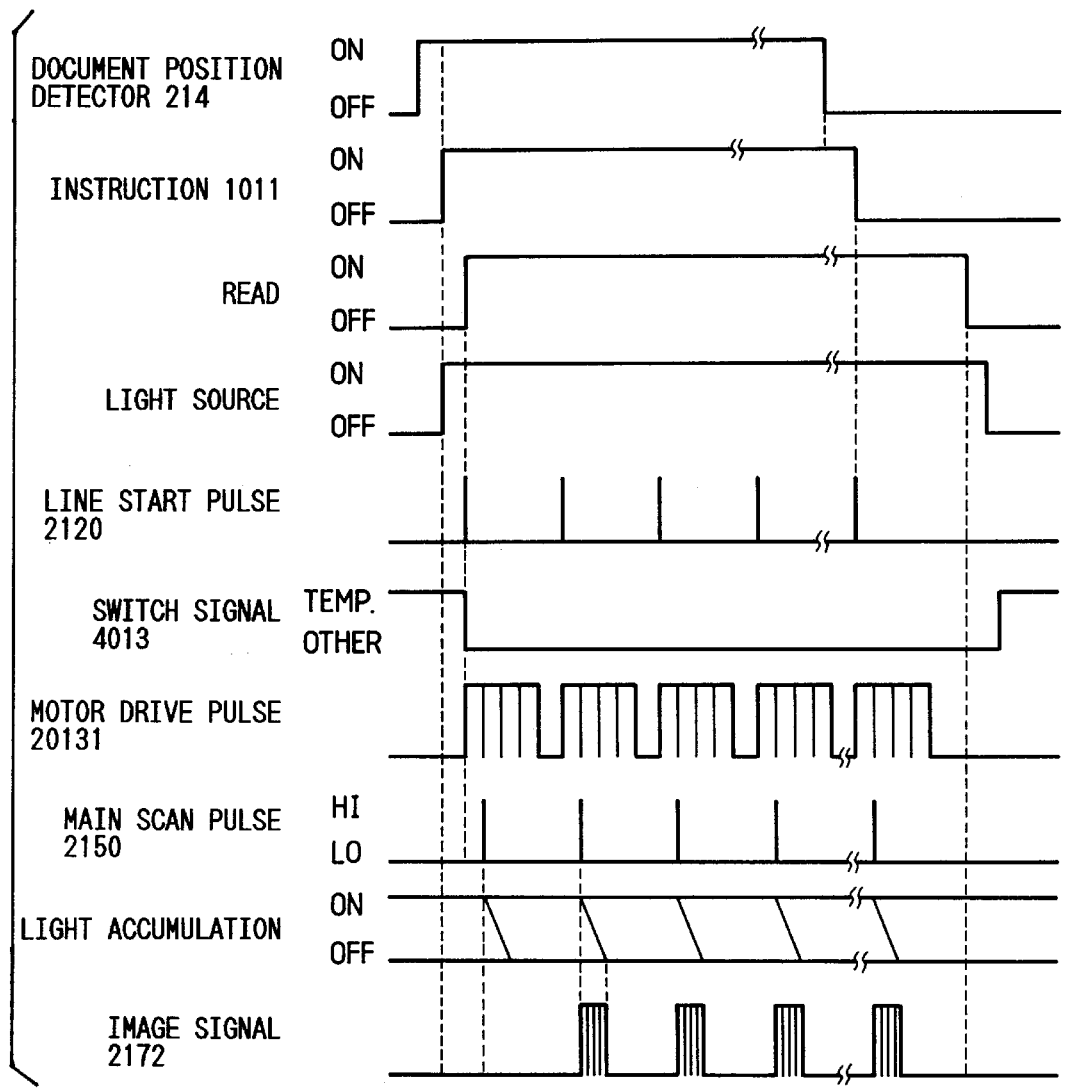
FIG. 23 is a timing chart of a read operation of the third embodiment shown in FIG. 16.

In FIG. 23, when the output of the original position detector 214 is turned ON indicating that the document 2 is set in the read portion 211, the controller 101 accepts a copying operation according to an operation content of the operation panel 103 and outputs a copy instruction 1011 to the read scan timing generator 4021 of the mode control portion 401. In the read portion 221, the light source of the read sensor 215 is lit and the sensor portion 217 accumulates light. When the original 2 passes through the read sensor 215 and the read operation is started, the read scan timing generator 4021 outputs a line start pulse 2120 every sub scan of 1 line, upon which the motor drive circuit 2013 generates motor drive pulse 20131 to rotate the roller 213. Since there is a time lag between the start of the motor 2121 and an actual start of the original 2 due to backlash and/or distortion of gear shafts of the gear train, the read scan timing generator 4021 generates the main scan pulse 2150 every line after the line start pulse 2120, so that the read sensor 215 scans 1 line and it is possible to read the image on the original 2. Since it is impossible to control accumulation of light from the light source 216 for the first line, it is necessary to discard the read image data 2172 read by the read sensor 215.

Figure 24:
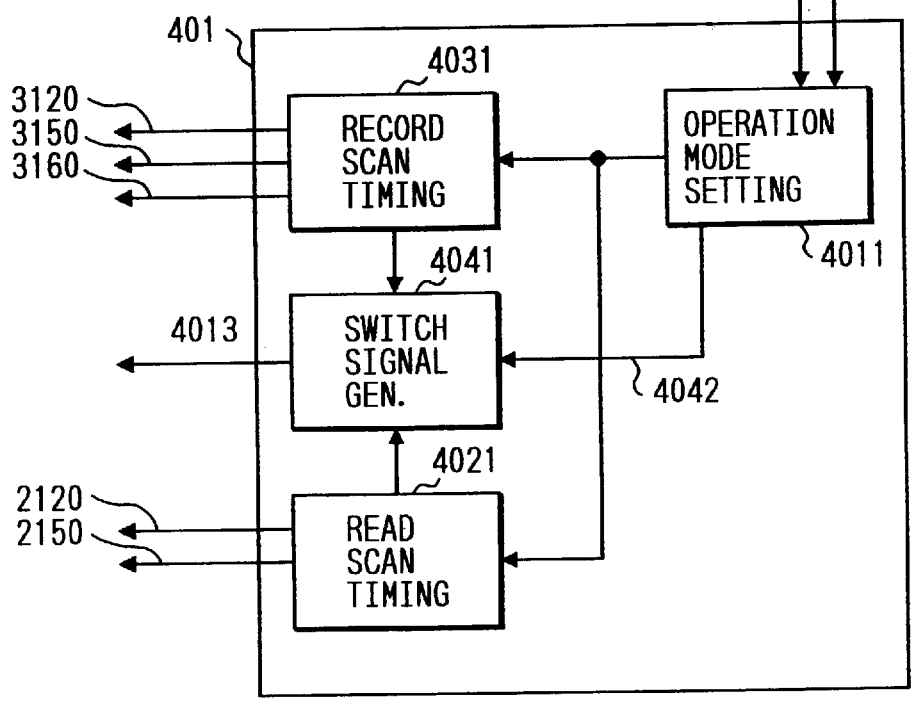
FIG. 24 is a block diagram of a mode control portion of the the third embodiment shown in FIG. 16.

FIG. 24 shows a construction of the mode control portion 401.

In FIG. 24, the mode control portion 401 comprises a record scan timing generator 4031 which determines an operation timing of the recording operation, a read scan timing generator portion 4021 for determining a timing of the read operation and an operation mode setting portion 4011. The speed switching portion 4011 responds to an operation start instruction 1010 from the controller 101, an operation mode input 1031 input through the operation panel 103 to output a copy instruction 1011 to the record scan timing portion 4031 and the read scan timing portion 4021. The record scan timing portion 4031 output a line start pulse 3150 and the main scan pulse 3120 to the record control portion 301 and a speed selection signal 3160 to the data transfer control portion 341. The read scan timing portion 4021 outputs the line start pulse 2120 and the main scan pulse 2150 to the read control portion 201 and to the signal processor 221.

Figure 25:
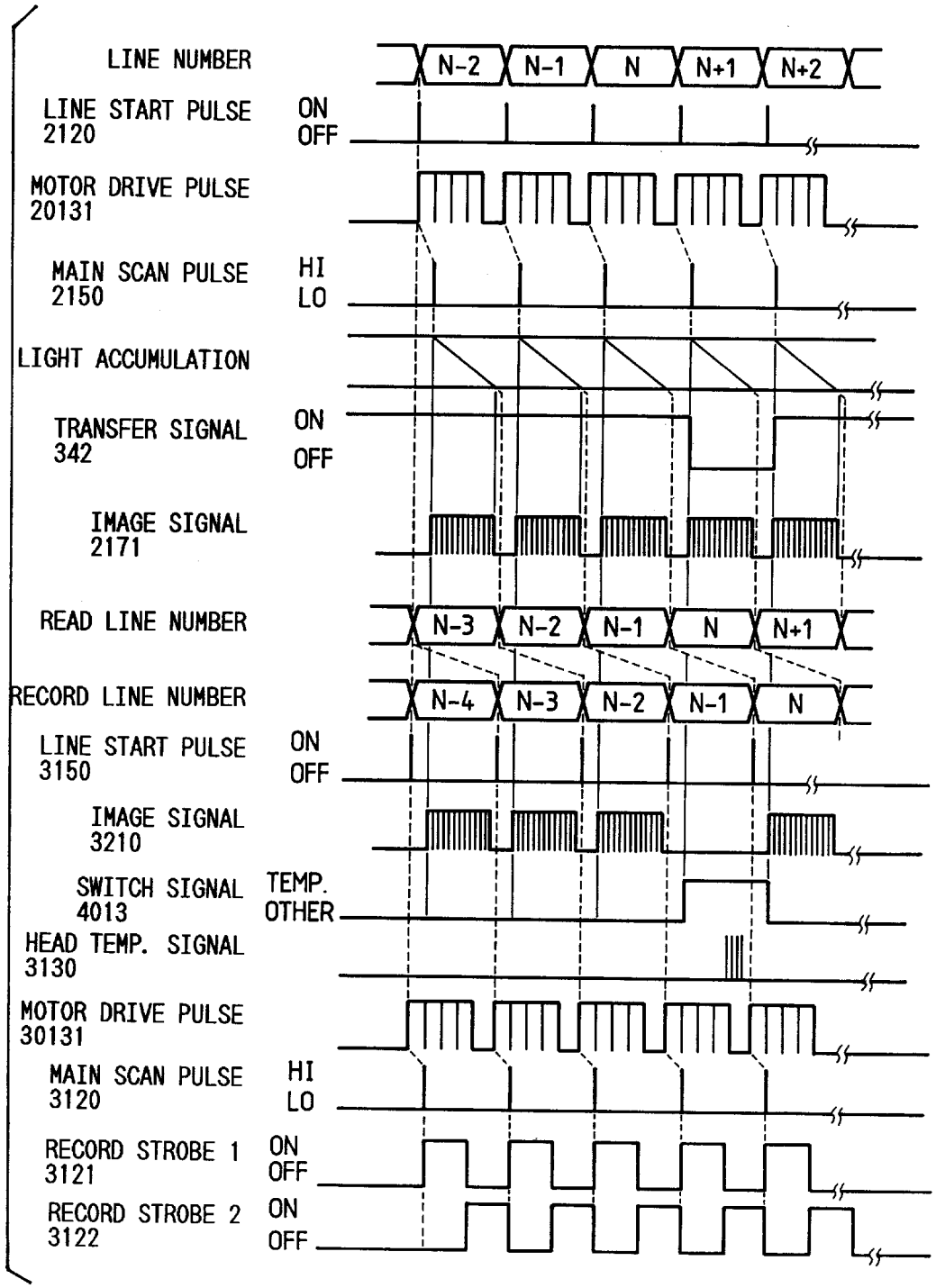
FIG. 25 is a timing chart of a copy operation of the third embodiment shown in FIG. 16.

Describing an operation of this embodiment, a copying operation is performed by the read portion 211 and the record portion 311 according to a copying timing shown in FIG. 25.

The read operation is basically performed according to the timing shown in FIG. 23 and the record operation is performed according to the timing shown in FIG. 20. However, this operation is featured by that the head temperature 3130 is get in every N lines and the record image data 3210 is interpolated with the data of the preceding line and that lines for which the image data is to be processed by the main scan are different in the read and record operations. In FIG. 25, the lines for copy which are managed by the mode control portion 401 is numbered N−2 to N+2.

In the copying operation, the read operation precedes the record operation.

The read operation synchronized with the line start pulse 2120 at the line number N−2 is performed once for 1 line and data read of the image data 2171 by the read sensor 215 is synchronized with the main scan pulse 2150 for the (N−1)th line since it delays. It is possible to read the image signal 2170 during valid read period and read the head temperature 3130 during the image scan which becomes invalid by switching the selector by the switching signal 4013 to the image signal side and to the head temperature side, respectively.

Further, the record operation by transferring the image data 2172 to the record head 312 is correctly performed every line with strobe width corresponding to the head temperature by selecting the standard record strobe data in the record head strobe pulse generator circuit 3014 shown in FIG. 8 according to the previously detected temperature data 3130 by means of the record strobes 3121 and 3122 synchronized with the main scan pulse 3120 for the Nth line.

Further, since the switching between the image signal 2170 and the head temperature 3130 is performed by the selector 32, it is only possible to perform the image read scan during the sub scan period of 1 line. Therefore, in the embodiment, a sub scan line is provided every N lines for reading only the head temperature 3130 so that the record data for a current sub scan line is not changed by setting the transfer signal OFF during the period of that line and the data for the preceding (N−1)th line which was transferred to the record head 312 is continuously recorded for interpolation. When the temperature data 3130 is read, the record head strobe pulse generator circuit sets the strobe width again according to the temperature data and the recording operation is performed with the latter strobe width until the head temperature 3130 is read again at the (2N+1)th line.

The copier according to the third embodiment of the present invention in which a read operation is performed once in 1 line to record data and temperature data is read every N lines in the copying operation and the record is performed according to the temperature data read every N lines while the record data is interpolated with the preceding data can provide a high quality image reading and recording operations. Although, in this embodiment, the read portion and the drive portion of the record portion use the respective motors, it is possible to use a single motor for driving the both portions by employing a gear train designed therefor.

Further, in this embodiment, the half line density recording (interpolation with preceding data) is peformed for only 1 line among N lines. By selecting a large N, it is possible to obtain a record quality similar to that without interpolation. In addition, the cost of the copier is reduced by the use of the single A/D converter.

Figure 26:
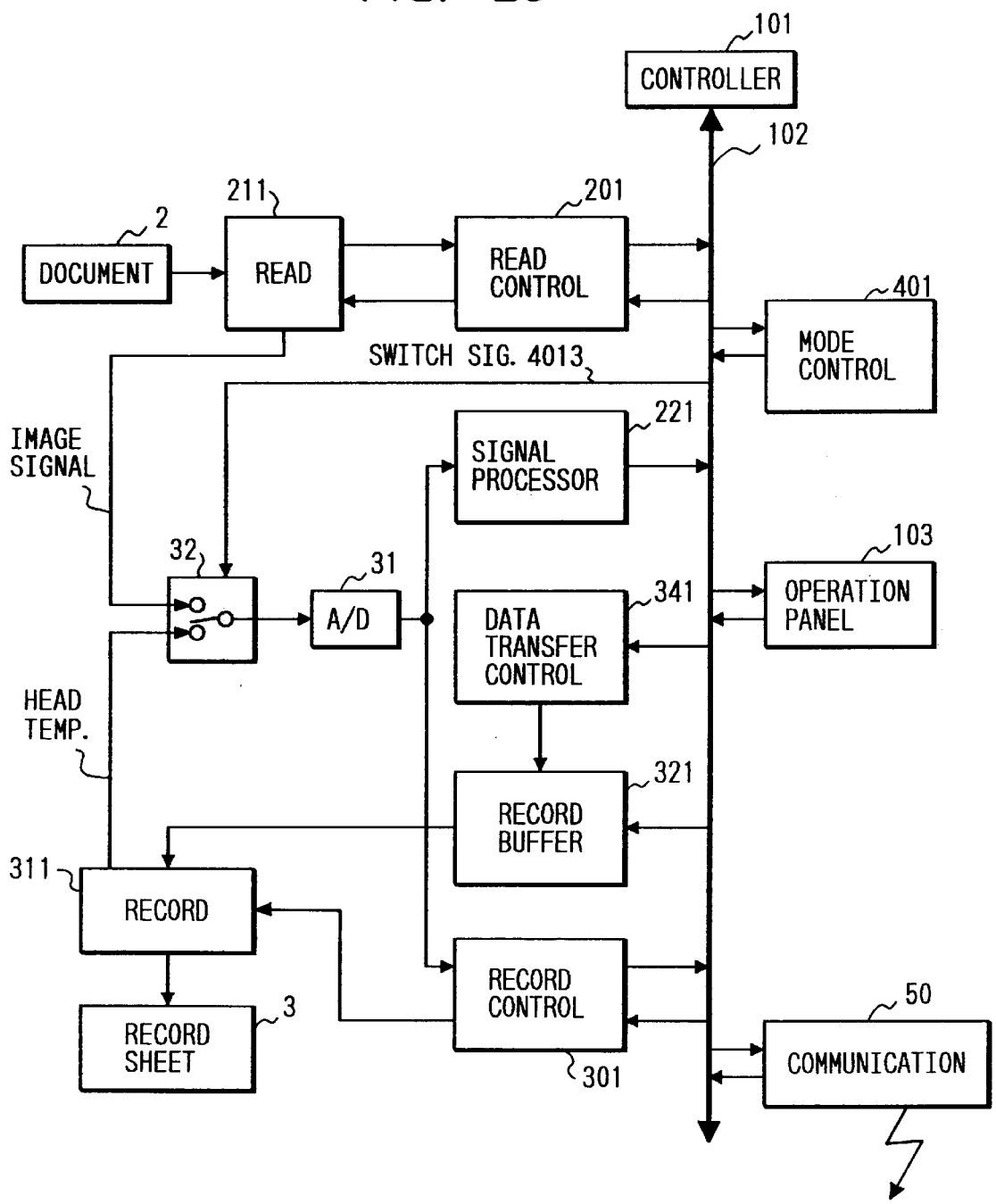
FIG. 26 is a block diagram of a fourth embodiment of the present invention when applied to a facsimile device.

FIG. 26 shows a fourth embodiment of the present invention applied to a facsimile device. This differs from the third embodiment shown in FIG. 16 in that a communication portion 50 is provided through the system bus 102. By storing an image data obtained through the communication system in the record buffer 321, the same effect as that obtained by the third embodiment can be obtained. In the case of facsimile device, the communication portion 50 is a MODEM. However, in a case of a universal printer, the communication portion may be constituted with RC232C or parallel interface, which is effective as a recording system.

Figure 27:
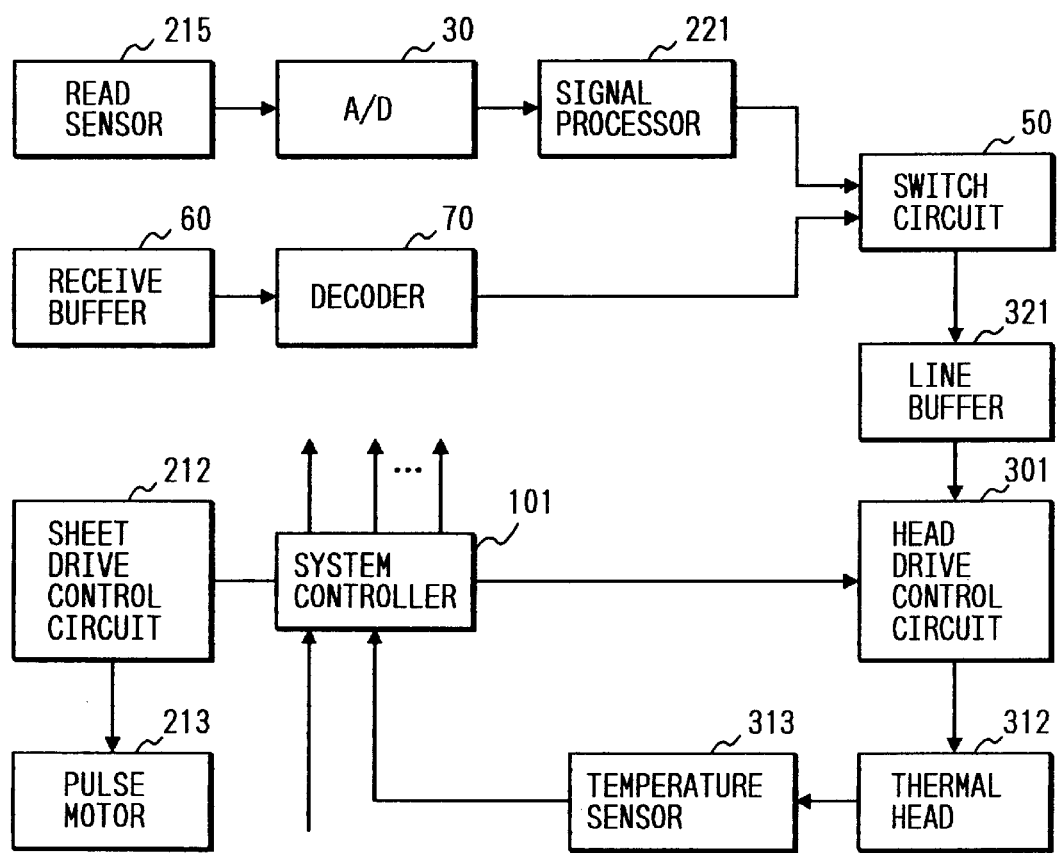
FIG. 27 is a block diagram showing a construction of a main portion of a facsimile system employing a thermographical recording device according to a fifth embodiment of the present invention.

FIG. 27 is a block diagram of a facsimile system including the thermographical recording device which is operable under the control of the control method according to a fifth embodiment of the present invention. In FIG. 27, a system controller 101 controls respective portions of the system on the basis of various predetermined control programs, respective set data and respective input information. A contact type read sensor (CCD line sensor) 215 reads an image at a rate of 5 or 6 ms/scan line under the control of the system controller 101. An amplifier/converter portion 30 includes an amplifier 31 and an A/D converter 32, for amplifying an output of the read sensor 215 and converting it into a digital signal. A signal processor 221 corrects a variation of the output digital signal of the amplifier/converter portion 30 and generates a binarized signal. The output signal of the signal processor 221 is transferred to a liner buffer 321 through a switching circuit 50 which is switched under the control of the system controller 101. Although in this embodiment DMA is employed as the data transfer system between respective blocks, any other data transfer system can be used.

A receiving buffer 60 receives coded data transferred through a telephone line and stores it. A decoder 70 decodes the data from the receiving buffer 60. The output signal of the decoder 70 is also transferred to the line buffer 321 through the switching circuit 50.

A head drive control circuit 301 is controlled by the system controller 101 to supply current to a thermal head 312 to heat it to thereby perform a thermographical recording on a recording sheet. A temperature sensor 313 measures temperature of the thermal head 312 (practically, temperature of, for example, a substrate of the thermal head 312) and sends the measured value to the system controller 101.

A recording sheet drive control circuit 212 drives a pulse motor 213 for transporting the recording sheet under control of the system controller 101. In this embodiment, the recording sheet is transported continuously at very low speed which is set at 5 ms/scan line, 6 ms/scan line or 10 ms/scan line.

Figure 28:
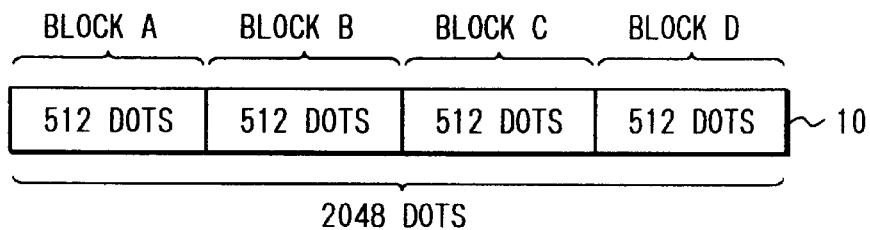
FIG. 28 illustrates a thermal head used in the thermographical recording device according to the fifth embodiment of the present invention.

FIG. 28 illustrates the thermal head 312. As shown in FIG. 28, the thermal head 312 includes 2048 heat generating elements to form 2048 dots/scan line and each heat generating element, that is, each resistor, is formed as a thick resistor film having better heat generating energy efficiency than that of a thin film type thermal head. A protective film of the thermal head 312 is thinner than that of the thin film type thermal head.

Figure 29:
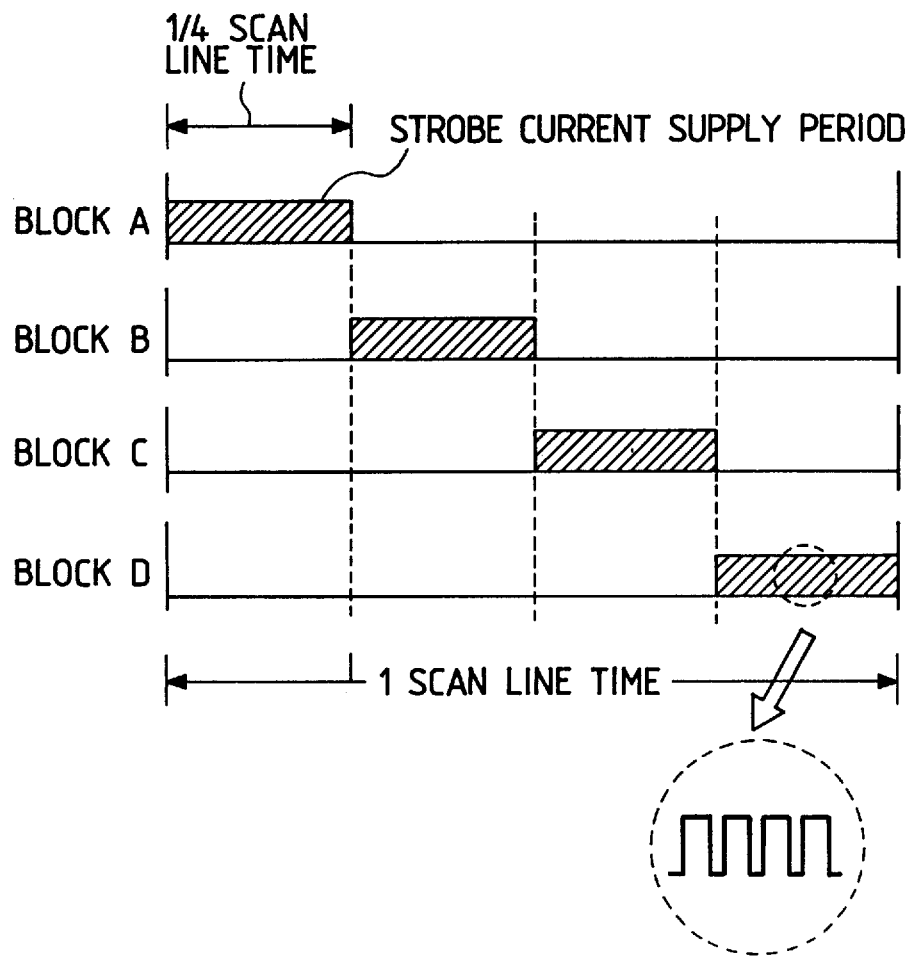
FIG. 29 illustrates an assignment of strobe current supply period in 1 scan line period of each block of thermal heads in FIG. 28.

In this embodiment, the heating region of the thermal head 312 is divided to four blocks A to D each including 512 dots as shown in FIG. 28 and a first one fourth of one scan line is assigned to a strobe current supply period for the heat generating elements in the block A, a second one fourth to the block B, a third one fourth to the block C and the last one fourth to the block D, so that the blocks A to D are heated cyclically in the sequence as shown in FIG. 29.

Figure 30:
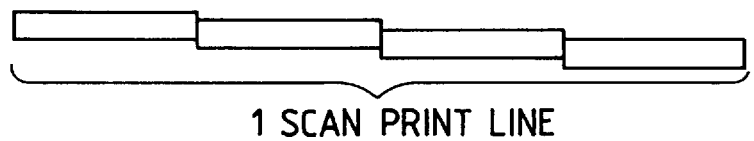
FIG. 30 illustrates 1 scan print line in the fifth embodiment of the present invention.

In the strobe current supply period, since the heat generating elements are supplied with a drive current in the form of continuous pulse, their outputs become as shown in FIG. 30. Recording concentration which is substantially uniform regardless of variation of the head temperature is obtained by controlling duty cycle of the drive current pulse according to the head temperature.

Figure 31:
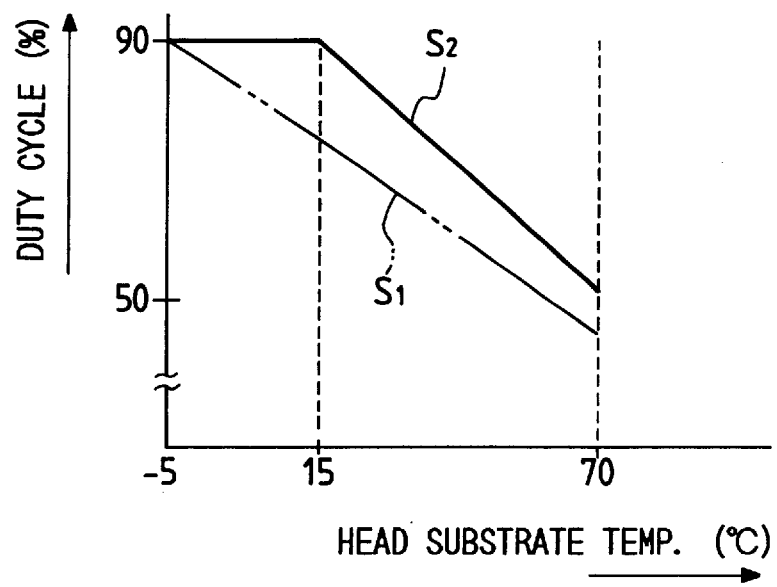
FIG. 31 is a graph showing a relationship between temperature in the vicinity of the head used in the fifth embodiment of the present invention and duty cycle.

FIG. 31 is a graph showing the relation between the head temperature and the duty cycle. In FIG. 31, the curve S1 is the duty control characteristics curve used in the low speed recording mode (10 ms/scan line) and S2 is the duty control characteristics curve used in the high speed recording mode (5 ms or 6 ms/scan line). As shown by the curve S1, the duty cycle is uniformly decreased from the maximum (about 90% in this embodiment) in the temperature region from the minimum head temperature (−5° C. in this embodiment) to the maximum temperature (70° C. in this embodiment). On the contrary, in the high speed recording mode, the duty cycle is constant at the maximum (90%) in the head temperature region from the minimum to a predetermined temperature (in this embodiment, 15° C.) and uniformly decreased in the head temperature range from the predetermined temperature to the maximum temperature as shown by the curve S2 in FIG. 31.

The temperature region in which the duty cycle curve S2 decreases is set such that recording energy which is larger than that obtained according to the curve Si by about 30% is obtained at the scan speed of 5 ms/scan line. Therefore, in the above mentioned temperature region, it is possible to maintain a sufficient record concentration with the aid of the improved head efficiency and the historical effect even at the high speed of 5 ms/scan line. However, the duty cycle in the region of the curve S2 in which the duty cycle is constant is substantially the upper limit determined by the capacity of power source and it is impossible to further increase the recording energy even if the duty cycle is increased further. Therefore, in this embodiment, the scanning speed is increased from 5 ms/scan line to 6 ms/scan line in the low head temperature region below 15° C. during the high speed recording mode to increase the recording energy by 20%.

Figure 32:
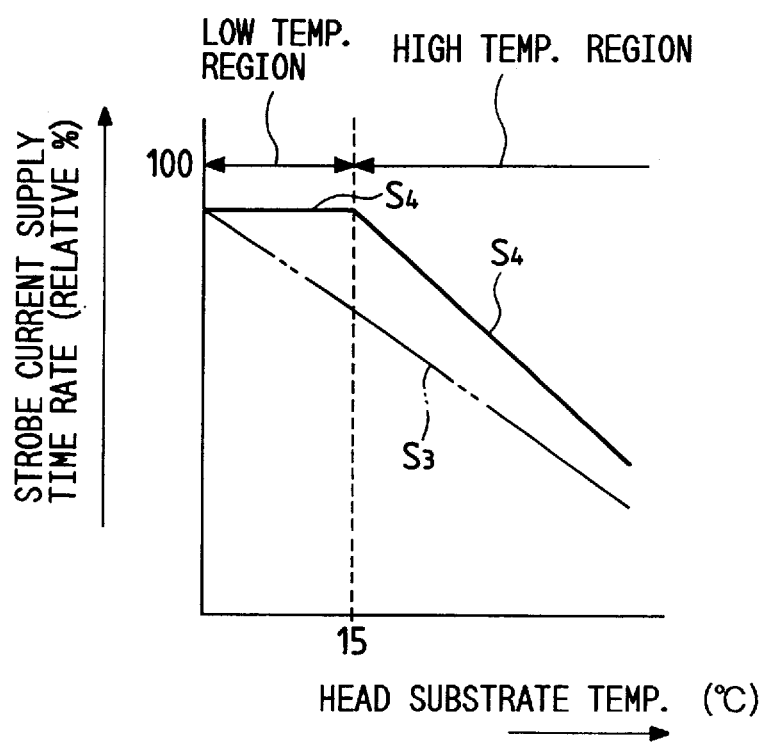
FIG. 32 is a graph showing a relationship between temperature in the vicinity of the head used in the fifth embodiment of the present invention and strobe current supply time rate.

To vary the duty cycle correspondingly to the head temperature is equivalent to varying the strobe current supply time rate for a predetermined time correspondingly to the head temperature. FIG. 32 shows a control characteristics representing the relation between the head temperature and the strobe current supply time rate (relative %) during one fourth of scan line shown in FIG. 29. In FIG. 32, the curve S3 shows the strobe current supply rate used in the low speed recording mode (10 ms/scan line) and the curve S4 shows that in the high speed recording mode (5 ms/scan line or 6 ms/scan line). Therefore, the same effect as that obtained in this embodiment in which the strobe current supply time rate is controlled by changing the duty cycle is obtainable by controlling current supply time of each pulse in the strobe current supply period assigned to the respective heat generating elements shown in FIG. 29.

The recording operation of this embodiment will be described with reference to a copy mode as an example. In this embodiment, the copy mode can be performed in either high speed record mode (5 or 6 ms/scan line) or low speed record mode (10 ms/scan line).

When a user assigns the low speed record mode, the system controller 1 sets the scan line time to 10 ms and controls the system with the setting. Under the control of the system controller 101, the read sensor 215 reads one line of the original twice with each exposing time of 5 ms. The first read data is discarded and the second read data is transferred to the line buffer 321 through the processor system. The record data is output from the line buffer 321 to the head drive control circuit 301 in synchronism with the one scan line time of 10 ms. The head drive control circuit 301 supplies current to the thermal head 312 on the basis of the record data input and the control signal from the system controller 101 for assigning the strobe current supply time rate corresponding to the current head temperature according to the strobe current supply time rate control characteristics S3 in the low speed record mode, so that the thermographical recording is performed on the recording sheet thereby. Simultaneously therewith, the recording sheet drive control circuit 212 drives the pulse motor 213 at a speed corresponding to the scan line time of 10 ms according to an instruction from the system controller 101 to feed the recording sheet.

On the other hand, when the user assigns the high speed recording mode, the system controller 101 compares the head temperature T with the preliminarily set predetermined temperature value Ts (=15° C.) at a timing immediately before the start of record of each page and decides as the high temperature range if T≧Ts and as the low temperature range if T<Ts.

When it is decided as the high temperature range, the system controller 101 sets the scan line time for recording the page to 5 ms. In this case, the read sensor 215 also reads one line of the original with each exposing time of 5 ms. The read data is transferred to the line buffer 321 through the processor system. The record data is output from the line buffer 321 to the head drive control circuit 301 in synchronism with the one scan line time of 5 ms. The head drive control circuit 301 supplies current to the thermal head 312 on the basis of the record data input and the control signal from the system controller 101 for assigning the strobe current supply time rate corresponding to the current head temperature according to the strobe current supply time rate control characteristics S4 in the high speed record mode, so that the thermographical recording is performed on the recording sheet thereby. Simultaneously therewith, the recording sheet drive control circuit 212 drives the pulse motor 213 at a speed corresponding to the scan line time of 5 ms according to an instruction from the system controller 101 to feed the recording sheet. Therefore, in the high temperature range in which the current supply time rate can be varied on the basis on the gradient of the characteristics curve S4, the recording at speed as high as 5 ms/scan line is achieved while maintaining good record concentration.

On the other hand, when it is decided as the low temperature range, the system controller 101 sets the scan line time for recording the page to 6 ms. In this case, the read sensor 215 also reads one line of the original with each exposing time of 6 ms. The read data is transferred to the line buffer 8 through the processor system. The record data is output from the line buffer 321 to the head drive control circuit 301 in synchronism with the one scan line time of 6 ms. The head drive control circuit 301 supplies current to the thermal head 312 on the basis of the record data input and the control signal from the system controller 101 for assigning the strobe current supply time rate corresponding to the current head temperature according to the strobe current supply time rate control characteristics S4 in the high speed record mode, so that the thermographical recording is performed on the recording sheet. Simultaneously therewith, the recording sheet drive control circuit 212 drives the pulse motor 213 at a speed corresponding to the scan line time of 6 ms according to an instruction from the system controller 1 to feed the recording sheet. In this case, the upper limit value of the strobe current supply time rate control characteristics curve S4 is used in at least the intial time of the recording to supply current for 6 ms/scan line which is larger than that for 5 ms/scan line by 20%. Therefore, it is possible to obtain a necessary and sufficient record concentration although the recording time becomes slightly longer compared with the case of 5 ms.

Therefore, it becomes possible to perform a very high speed recording at 5 ms or 6 ms while maintaining good record concentration.

Figure 33:
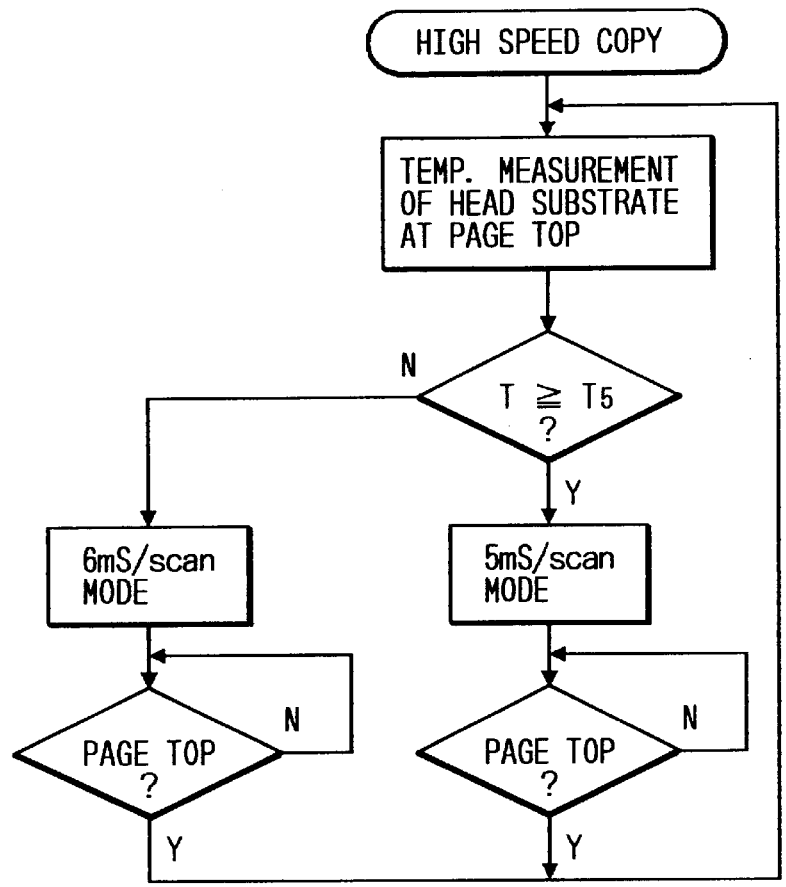
FIG. 33 is a flowchart of a system controller in the fifth embodiment of the present invention in a high speed record mode.

FIG. 33 is a flowchart showing the processing performed in the system controller 1 when the high speed recording mode is selected.

Figure 34:
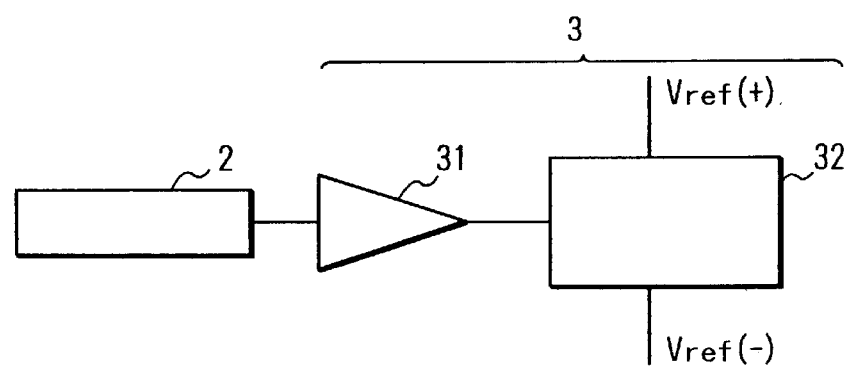
FIG. 34 is a block diagram showing an amplifier and A/D converter portion of the fifth embodiment of the present invention.

In this embodiment, there is no page memory and the exposing time of the read sensor 215 is 5 ms or 6 ms. Therefore, in the case of 6 ms, the output signal level of the read sensor 215 is increased by 20% compared with the case of 5 ms. Therefore, the amplifier/converter portion 30 must not be saturated even when the exposing time of the read sensor 215 becomes 6 ms. Assuming that the exposing time of the read sensor 215 is 6 ms, the output signal level of the read sensor 215 becomes the maximum 2.0 V in view of the temperature characteristics. However, by setting Vref(+) of the A/D converter 32 for converting the output signal of the read sensor 215 input through the amplifier 31 to 2.0 V as shown in FIG. 34, it is possible to process the output signal of the read sensor without saturation. And by changing the table set in the signal processor 221 by the system controller 101, the output signal of the read sensor 215 can be processed such that it becomes constant regardless of the exposing time.

In a system having a page memory, after a full page is read and stored in the page memory, a recording of the read page is executed through the respective controls mentioned above in a copy mode.

Although, in the above description, the high speed record mode is selectable in the copy mode of the facsimile device, it is also selectable in a receiving mode of the facsimile device. Further, this embodiment is applicable to thermographical recording devices other than those used in the facsimile device.

As described, according to the fifth embodiment, the recording at a speed substantially twice that in the conventional device is achieved while maintaining good record concentration, without increasing the capacity of power source.

What is claimed is:

1. A thermographical image copier comprising:
   read means for reading an image on a document and outputting an image signal;
   read control means for controlling said read means;
   signal processing means for processing the image signal for said read means to output as an image data;
   a record buffer for temporarily storing the image data from said image signal processing means;
   recording means for recording an image on a recording sheet on the basis of the image data output from said record buffer;
   record control means for controlling said recording means; and
   mode control means for controlling said read control means, said signal processing means and said record control means according to a mode selected from a first mode and a second mode,
   wherein, during a read operation in said first mode, said mode control means controls said read control means such that said read means reads the image by performing N read main scans during one read sub scan, where N is an integer larger than 1, and outputs the read image as an image signal and controls said signal processing means such that an image data corresponding to one read main scan is selected from the image data obtained by the N read main scans and output, and, during a record operation in said first mode, controls said record control means such that said record means records an image on the basis of the image data corresponding to one read main scan by one record main scan during one record sub scan,
   wherein, during a read operation in said second mode, said mode control means controls said read control means such that a read sub scan speed becomes N times that in the first mode and said read means reads the image by performing one read main scan during one read sub scan and outputs the read image as an image signal and, during a record operation in said second mode, controls said record control means such that said record means records the image by one record main scan on the basis of the image data obtained by the one read main scan, and
   wherein a real-time copying operation is executed by synchronizing said one read sub scan of said read means and said one record sub scan of said recording means.

2. A thermographical image copier comprising:
   read means for reading an image on a document and outputting the read image as an image signal;
   read control means for controlling said read means;
   record head temperature detection means for detecting temperature of a thermal print head provided in a record means and outputting the detected temperature as a head temperature signal;
   switching means for selectively outputting either one of the image signal from said read means and the head temperature signal from said record head temperature detection means;
   analog to digital conversion means for converting the output of said switching means into a digital signal;
   signal processing means for processing the image signal when said switching means outputs the image signal to produce an image data;
   a record buffer for temporarily storing the image data from said image signal processing means;
   said record means for recording an image on a recording sheet by said thermal print head on the basis of the image data output from said record buffer;
   record control means for controlling said record means when said switching means outputs the head temperature signal on the basis of the head temperature signal digitized by said analog to digital conversion means; and
   mode control means for controlling said read control means, said signal processing means and said record control means according to a mode selected from a first mode and a second mode,
   said mode control means, during a read operation in said first mode, controlling said read control means such that said read means reads the image by performing N read main scans during one read sub scan, where N is an integer larger than 1, and outputs the read image as an image signal, controlling said signal switching means such that said switching means selects an image signal from said read means corresponding to one read main scan of the N read main scans and outputs the image signal while selecting the head temperature signal during the other read main scans of the N read main scans and controlling said signal processing means such that the image signal is selected from the signals output from said analog to digital conversion means and output as the image data,
   said mode control means, during a record operation in said first mode, controlling said record control means such that said record means records the image by performing one record main scan during one record sub scan on the basis of the image data corresponding to one read main scan,
   said mode control means, during a read operation in said second mode, setting a read sub scan speed N times that in said first mode and controlling said read control means such that said read means reads the image by performing one read main scan during one read sub scan and outputs the read image as an image signal and, during a record operation in said second mode, controlling said record control means such that said record means records the image by one record main scan on the basis of the image data obtained by the one read main scan, and
   wherein a real-time copying operation is executed by synchronizing said one read sub scan of said read means and said one record sub scan of said recording means.

3. An image recording device comprising:

record means including a thermal print head; record head temperature detection means; record control means; a record buffer; read means; read control means; signal processing means; signal switching means; an A/D converter; mode control means; speed switching means; and means including an operation panel and a controller, for supplying outputs of said record head temperature detection means and said read means to said signal switching means and outputting one of said outputs to said A/D converter, wherein, during a read operation, at least one read main scan is performed in one read sub scan to take in a read image data through said A/D converter and an image record operation is controlled according to a record mode such that, during a record operation of the read image data, one record main scan is performed in one record sub scan and a record head temperature is taken in through said A/D converter by invalidating the read main scan of said read means once every n read sub scans by said signal switching means where n is an integer larger than 1 and a record image data from a current record sub scan is recorded instead of a record image data from a preceding record sub scan, and wherein a real-time copying operation is executed by synchronizing said one read sub scan of said read means and said one record sub scan of said recording means.

* * * * *